United States Patent
Hoshino et al.

(10) Patent No.: US 8,147,342 B2
(45) Date of Patent: Apr. 3, 2012

(54) FIXED-TYPE CONSTANT-VELOCITY UNIVERSAL JOINT

(75) Inventors: Manabu Hoshino, Iwata (JP); Tohru Nakagawa, Iwata (JP); Hiroshi Tone, Iwata (JP); Wasaburo Suganuma, Iwata (JP)

(73) Assignee: NTN Corporation, Osaka (JP)

( * ) Notice: Subject to any disclaimer, the term of this patent is extended or adjusted under 35 U.S.C. 154(b) by 901 days.

(21) Appl. No.: 11/372,040

(22) Filed: Mar. 10, 2006

(65) Prior Publication Data
US 2006/0217207 A1    Sep. 28, 2006

(30) Foreign Application Priority Data

| Mar. 22, 2005 | (JP) | 2005-082324 |
| Mar. 23, 2005 | (JP) | 2005-084265 |
| Mar. 25, 2005 | (JP) | 2005-089055 |
| Jul. 7, 2005 | (JP) | 2005-198996 |
| Jul. 13, 2005 | (JP) | 2005-204421 |
| Jul. 25, 2005 | (JP) | 2005-214686 |
| Jul. 25, 2005 | (JP) | 2005-214694 |

(51) Int. Cl.
*F16D 3/00* (2006.01)

(52) U.S. Cl. ........................ 464/145; 464/906

(58) Field of Classification Search .................. 464/145, 464/906
See application file for complete search history.

(56) References Cited

U.S. PATENT DOCUMENTS

| 4,231,232 A | 11/1980 | Otsuka et al. |
| 4,494,941 A | 1/1985 | Hirai et al. |
| 4,878,882 A | 11/1989 | Welschof et al. |
| 6,068,408 A | 5/2000 | Mutoh et al. |
| 6,299,542 B1 | 10/2001 | Ouchi et al. |
| 6,431,988 B1* | 8/2002 | Tone .............................. 464/145 |
| 6,478,683 B1 | 11/2002 | Ouchi et al. |
| 137,991 A1 | 7/2004 | Weckerling |

(Continued)

FOREIGN PATENT DOCUMENTS

EP    0 819 862    1/1998

(Continued)

OTHER PUBLICATIONS

Partial European Search Report issued Apr. 6, 2009 in EP 06 25 1417 which corresponds to the present application.

(Continued)

*Primary Examiner* — Victor MacArthur
(74) *Attorney, Agent, or Firm* — Wenderoth, Lind & Ponack, L.L.P.

(57) ABSTRACT

Internal dimensions for fixed-type constant velocity universal joints are defined to optimize the geometry of the components of the joints and to readily achieve a larger operating angle of the joints.
In the joint, the track grooves of an outer ring and an inner ring are tapered by an angle not exceeding 12°. The ratio (f/PCR) of the cage offset amount f to PCR is greater than 0 and smaller than or equal to 0.12. The ratio (Do/d) of the cage outer diameter (Do) to the ball diameter (d), the ratio (t/d) of the cage wall thickness (t) to the ball diameter (d), and the ratio (w/d) of the cage width (w) to the ball diameter (d) are such that $3.9 \leq Do/d \leq 4.1$, $0.31 \leq t/d \leq 0.34$, and $1.8 \leq w/d \leq 2.0$, respectively. The end of the spherical outer surface of the cage adjacent to the open end is axially extended, and the end of the spherical inner surface of the cage adjacent to the open end is tapered so that the tapered surface has an increasing diameter toward the end of the spherical outer surface adjacent to the open end. Part of the spherical outer surface of the cage is cut on the open end side of pockets, and the outer diameter of the cage across the two opposing planer cut faces is smaller than the spigot diameter of the outer ring.

12 Claims, 17 Drawing Sheets

U.S. PATENT DOCUMENTS

| | | |
|---|---|---|
| 2001/0021671 A1 | 9/2001 | Ouchi et al. |
| 2001/0024976 A1 | 9/2001 | Ouchi et al. |
| 2002/0032064 A1 | 3/2002 | Sone et al. |
| 2003/0083135 A1 | 5/2003 | Yamazaki et al. |
| 2005/0079918 A1 | 4/2005 | Kobayashi et al. |

FOREIGN PATENT DOCUMENTS

| | | |
|---|---|---|
| FR | 2 798 709 | 3/2001 |
| FR | 2 847 316 | 5/2004 |
| GB | 2 010 443 | 6/1979 |
| GB | 2 097 513 | 11/1982 |
| GB | 2 203 219 | 10/1988 |
| JP | 58-172127 | 11/1983 |
| JP | 4-77027 | 7/1992 |
| JP | 07-301246 | 11/1995 |
| JP | 8-338434 | 12/1996 |
| JP | 11-311257 | 11/1999 |
| JP | 2000-055068 | 2/2000 |
| JP | 2000-55069 | 2/2000 |
| JP | 2001-153149 | 6/2001 |
| JP | 2001-304282 | 10/2001 |
| JP | 2001-349332 | 12/2001 |
| JP | 2003-021158 | 1/2003 |
| JP | 2003-130082 | 5/2003 |
| JP | 2003-307235 | 10/2003 |
| JP | 2004-332817 | 11/2004 |
| JP | 2005-83408 | 3/2005 |
| JP | 2007-016899 | 1/2007 |

OTHER PUBLICATIONS

European Search Report issued Jul. 22, 2009 in corresponding European Application No. 06 25 1417.

* cited by examiner

Comparison of stress applied to frame under maximum pocket load

Comparison of pocket load (maximum)

FIXED-TYPE CONSTANT-VELOCITY UNIVERSAL JOINT

BACKGROUND OF THE INVENTION

1. Field of the Invention

The present invention relates to fixed-type constant velocity universal joints. Constant velocity universal joints are used in the power transmission of automobiles and various industrial machines and transmit torque from a driving shaft to a driven shaft at a constant angular velocity. Two types of constant velocity universal joints are known: fixed-type, which permits only angular displacement, and slidable-type, which permits both angular and axial displacement.

2. Description of the Related Art

A typical fixed-type constant velocity universal joint includes the following components: an outer joint member that is connected to a driving or driven shaft in a torque-transmitting manner; an inner joint member that is connected to the driven or driving shaft in a torque-transmitting manner; a plurality of balls placed between the outer and inner joint members to transmit torque; and a cage that holds the balls within the bisecting-plane of the angle between the driving and driven shafts.

Recent concern about ensuring safety of automobiles upon collision has led to the design of automobiles with longer wheelbase. To prevent the associated increase in the steering radius, the steering angle of the front wheels needs to be increased by increasing the operating angle of the fixed-type constant velocity universal joints, which are used as connecting joints in the drive shafts of automobiles.

To increase the operating angle of fixed-type constant velocity universal joints, it has been proposed to form track grooves with tapered bottoms in the outer and joint members so that the corresponding grooves together form ball tracks in which the balls roll (See, for example, Japanese Patent Laid-Open Publications No. 2001-153149, No. 2001-304282, and No. 2001-349332).

In previous attempts to increase the operating angle of fixed-type constant velocity universal joints, defining the taper angle of the track grooves of the outer and inner joint members has not been considered particularly important.

Although the fixed-type constant velocity universal joints described in the above-mentioned publications each have outer and inner joint members featuring tapered track grooves that permit a larger operating angle of the joint, the current trend toward lightweight and compact joints puts a limitation on the outer diameter of the outer joint member, and if the taper angle of the track grooves is to be increased, the wall thickness of the outer joint member will inevitably be decreased, resulting in a decreased strength of the outer joint member. The increase in the taper angle of the track grooves also results in an increase in the load exerted upon the side wall of the cage pocket by the balls received by the cage: The load exerted upon the cage pocket increases in proportion to the taper angle of the track groove (FIG. 22).

In the fixed-type constant velocity universal joint disclosed in Japanese Patent Laid-Open Publication No. 2001-153149, the amount of the cage offset is large enough so that the load exerted upon the cage pocket by the ball in its outermost position or phase (phase angle $\phi=0°$; FIG. 3) can be kept small. In other conventional constant velocity universal joints, however, the load exerted by the ball in the 0° phase generally increases as the operating angle of the joint is increased.

SUMMARY OF THE INVENTION

It is an object of the present invention to determine optimum internal dimensions for fixed-type constant velocity universal joints to thereby optimize the geometry of each component of the joints and thereby readily achieve a larger operating angle of the joints.

(1) The present invention achieves this object by defining, of all the internal dimensions of fixed-type constant velocity universal joints, the upper limit of the optimum taper angle of the track grooves of the outer and inner joint members.

Specifically, a fixed-type constant velocity universal joint of the present invention comprises:

an outer joint member having a spherical inner surface with an open end and a plurality of track grooves formed on the spherical inner surface, the track grooves each extending along an axis direction toward the open end and equally spaced apart along the circumference of the spherical inner surface;

an inner joint member having a spherical outer surface and a plurality of track grooves corresponding to the track grooves of the outer joint member formed on the spherical outer surface, the track grooves each extending along the axis direction and equally spaced apart along the circumference of the spherical outer surface;

a plurality of balls received in the respective track grooves of the outer and inner joint members so as to transmit torque; and a cage for holding the plurality of balls, the cage arranged between the spherical inner surface of the outer joint member and the spherical outer surface of the inner joint member, the cage having a spherical inner surface and a spherical outer surface, wherein:

a center of the spherical outer surface of the cage and a center of the spherical inner surface of the cage are oppositely offset from a center of the joint by an equal distance along the axis direction;

a wall of the cage, as viewed in longitudinal section, is relatively thick in an area adjacent to the open end of the outer joint member and is relatively thin in an area away from the open end;

the track grooves of the outer joint member each have a bottom linearly tapered in an area adjacent to the open end so that a depth of the grooves increases toward the open end;

the track grooves of the inner joint member each have a bottom linearly tapered in an area away from the open end so that a depth of the grooves decreases toward the end of the inner joint member opposite to the open end; and a taper angle of the track grooves of the outer and inner joint members is set to 12° or smaller.

According to the present invention, the respective track grooves of the outer and inner joint members are tapered, so that the operating angle of fixed-type constant velocity universal joint can be readily increased by thinning the outer joint member without increasing the outer diameter of the outer joint member, or compromising on the strength or workability of the outer joint member. For the purpose of determining optimum internal dimensions of fixed-type constant velocity universal joint, the present applicant has investigated, of all the internal dimensions of fixed-type constant velocity universal joints, the effect and outcome of forming tapered track grooves and, as a result, has determined that the upper limit of the optimum taper angle of the track grooves is 12°.

The present applicant has conducted studies using static internal force analysis as well as finite element method (FEM) to determine the optimum range of the taper angle of the track grooves. The optimum range of the taper angle must be determined so that the tapering does not affect strength, durability and other essential conditions required for the joints. Samples with different taper angles were evaluated to see if the results were consistent with the optimum angle determined by the analysis.

By defining the upper limit of the optimum range of the track grooves of outer and inner joint members (i.e., 12°), the operating angle of fixed-type constant velocity universal joints can be readily increased without decreasing the strength and workability of the joints. This allows a larger steering angle for the front wheels of automobiles and, thus, helps keep the steering radius small, meeting the requirement for automobiles with longer wheelbases that have become increasingly popular because of their improved safety upon collision.

(2) The present invention achieves the above-described object by evaluating the internal force exerted upon the inside of the joint in the case of forming tapered track grooves, specifically, the load applied to the pocket, taking the effect on the joint strength by the load into consideration, and defining, of all the internal dimensions of fixed-type constant velocity universal joints, the optimum geometry of the cage.

Specifically, a fixed-type constant velocity universal joint of the present invention comprises:

an outer joint member having a spherical inner surface with an open end and a plurality of track grooves formed on the spherical inner surface, the track grooves each extending along an axis direction toward the open end and equally spaced apart along the circumference of the spherical inner surface;

an inner joint member having a spherical outer surface and a plurality of track grooves corresponding to the track grooves of the outer joint member formed on the spherical outer surface, the track grooves each extending along the axis direction and equally spaced apart along the circumference of the spherical outer surface;

a plurality of balls received in the respective track grooves of the outer and inner joint members so as to transmit torque; and a cage for holding the plurality of balls, the cage arranged between the spherical inner surface of the outer joint member and the spherical outer surface of the inner joint member, the case having a spherical outer surface and a spherical inner surface, wherein:

a center of the spherical outer surface of the cage and a center of the spherical inner surface of the cage are oppositely offset from a center of the joint by an equal distance along the axis direction;

a wall of the cage, as viewed in longitudinal section, is relatively thick in an area adjacent to the open end of the outer joint member and is relatively thin in an area away from the open end;

the track grooves of the outer joint member each have a bottom linearly tapered in an area adjacent to the open end so that a depth of the grooves increases toward the open end;

the track grooves of the inner joint member each have a bottom linearly tapered in an area away from the open end so that a depth of the grooves decreases toward the end of the inner joint member opposite to the open end; and a ratio (Do/d) of a cage outer diameter (Do) to a ball diameter (d) is in a range of from 3.9 to 4.1, a ratio (t/d) of a cage wall thickness (t) to the ball diameter (d) is in a range of from 0.31 to 0.34, and a ratio (w/d) of a cage width (w) to the ball diameter (d) is in a range of from 1.8 to 2.0.

While the ratio (Do/d) of the cage outer diameter (Do) to the ball diameter (d) for conventional fixed-type constant velocity universal joints is such that $3.7 \leq Do/d \leq 3.8$, the same ratio falls within the range of $3.9 \leq Do/d \leq 4.1$ for the joint according to the present invention. This is for the following reason: As the operating angle is increased, the amount that the ball travels within the pocket along the cage axis increases (see FIG. 3, wherein 'm' indicates radially outermost point at which the ball contacts with the cage and 'n' indicates radially innermost point at which the ball contacts with the cage). The lower limit of the cage outer diameter is automatically determined since the contact point of the ball with the cage has to remain within the cage even when the joint is operated at the maximum operating angle. On the other hand, if the cage outer diameter is too large, the depth of the track grooves of the outer joint member may not be sufficient and in such a case, the durability of the outer joint member may be decreased. The upper limit of the cage outer diameter should therefore be determined so that the minimum durability is ensured.

While the ratio (t/d) of the cage wall thickness (t) to the ball diameter (d) for conventional fixed-type constant velocity joints is such that $0.24 \leq t/d \leq 0.27$, the same ratio falls within the range of $0.31 \leq Do/d \leq 0.34$ for the joint according to the present invention. This is for the following reason: The cage wall thickness (t) is defined by the cage outer diameter (Do), as determined from the above-described value of Do/d. The cage inner diameter is determined by the following principle: As with the case of the above-described value of Do/d, the upper limit of the cage inner diameter is determined so that the contact point of the ball with the cage exists, whereas the lower limit is determined so that the depth of the track grooves of the inner joint member is sufficient and, namely, the durability is ensured.

While the ratio (w/d) of the cage width (w) to the ball diameter (d) for conventional fixed-type constant velocity universal joints is such that $1.7 \leq w/d \leq 1.9$, the same ratio falls within the range of $1.8 \leq w/d \leq 2.0$ for the joint according to the present invention. This is for the following reason: The section modulus of the side wall of the cage pocket must be within a specific range in order to keep the stress applied to the side wall as a result or increased load at an equal or lower level than in conventional fixed-type constant velocity universal joints. To this end, the section modulus must be adjusted by varying the cage width since the outer and inner diameters are determined solely by the above-described values of Do/d and t/d.

By selecting as the minimum cage width a width at which the applied stress becomes comparable to the stress observed in conventional fixed-type constant velocity universal joints, the strength of the joint can be maintained at a level comparable to conventional fixed-type constant velocity universal joints. The upper limit of the cage width is determined so that the difference between the upper limit and the lower limit of the width (i.e., the range specified by the standard) is the same as that determined for conventional fixed-type constant velocity universal joints: Too large a width can result in increased weight and increased cost for the material.

(3) The present invention achieves the above-described object by defining, of all the internal dimensions of fixed-type constant velocity universal joints, the optimum geometry of the cage so that the cage can readily be assembled with the outer joint member while the reduction in the joint strength and durability, as well as the loss of torque transmission, is considered.

Specifically, a fixed-type constant velocity universal joint of the present invention comprises:

an outer joint member having a spherical inner surface with an open end and a plurality of track grooves formed on the spherical inner surface, the track grooves each extending along an axis direction toward the open end and equally spaced apart along the circumference of the spherical inner surface;

an inner joint member having a spherical outer surface and a plurality of track grooves corresponding to the track grooves of the outer joint member formed on the spherical outer surface, the track grooves each extending along the axis direction and equally spaced apart along the circumference of the spherical outer surface;

a plurality of balls received in the respective track grooves of the outer and inner joint members so as to transmit torque; and a cage for holding the plurality of balls, the cage arranged between the spherical inner surface of the outer joint member and the spherical outer surface of the inner joint member, the case having a spherical outer surface and a spherical inner surface, wherein:

a center of the spherical outer surface of the cage and a center of the spherical inner surface of the cage are oppositely offset from a center of the joint by an equal distance along the axis direction;

a wall of the cage, as viewed in longitudinal section, is relatively thick in an area adjacent to the open end of the outer joint member and is relatively thin in an area away from the open end;

the track grooves of the outer joint member each have a bottom linearly tapered in an area adjacent to the open end so that a depth of the grooves increases toward the open end;

the track grooves of the inner joint member each have a bottom linearly tapered in an area away from the open end so that a depth of the grooves decreases toward the end of the inner joint member opposite to the open end; and part of the spherical outer surface of the cage is cut on the open end side of at least two opposing pockets, the outer diameter of the cage across the two opposing cut portions being smaller than a spigot diameter of the outer joint member.

In this invention, part of the spherical outer surface of the cage is cut on the open end side of at least two opposing pockets. In this case, the spherical outer surface of the cage can be cut on the open end side of the pockets so that the contact point of the cage with the ball exists when the joint is operated at the maximum operating angle, at which the angle that the rotation axis of the outer joint member makes with the rotation axis of the inner joint member becomes the largest.

That the contact point of the cage with the ball exists is equivalent to that the ball, when in the phase in which it is most likely to come out of the cage pocket (phase angle $\phi=0°$), is kept from doing so. While the partial cut is made for at least an opposing pair of pockets, the cut may be made for all of the opposing pairs of pockets.

The reason that the cut is made for at least two opposing pockets is as follows: During assembly of the cage with the outer joint member, the cage is first inserted into the outer joint member with its axis kept perpendicular to the axis of the outer joint member. After insertion into the outer joint member, the cage is turned by 90° so that its axis is aligned with the axis of the outer joint member. The insertion of the cage into the outer joint member is possible if the cut is made for at least two opposing pockets and the cage outer diameter across the two cut portions is smaller than the spigot diameter of the outer joint member.

The above-described construction of the present invention, in which part of the spherical outer surface of the cage is cut on the open end side of at least two opposing pockets, and the outer diameter of the cage across the two opposing cut portions is smaller than the spigot diameter of the outer joint member, makes it possible, while ensuring the strength of the cage, to design a cage with a reduced outer diameter and thus, a reduced spigot diameter of the outer joint member. This construction permits relatively large embrace angle (spherical surface angle) and thus facilitates assembling of the cage with the outer joint member without reducing the strength and durability of the joint or losing torque transmission. As a result, the quality of the joint is improved, as is the assembling of the joint.

When a dynamic twisting torque higher than the permissible level is applied to this joint, the track grooves of the outer and inner joint members are deformed, causing the edges of the track grooves to rise. A correlation exists between the area of a groove that receives pressure and the height of the resulting rise such that the shallower the track groove the higher the rise.

Accordingly, the rise tends to become higher as the taper angle of the track grooves is increased. The rise interferes with the spherical cage surface and restricts the move of the cage. This may cause stress exerted upon the edge of the ball-receiving pockets arranged along the circumference of the cage and may result in cracking and chipping.

(4) The present invention achieves the above-described object by defining, of all the internal dimensions of fixed-type constant velocity universal joints, the optimum geometry of the cage that takes into account the interference between the rise formed along the edge of the track grooves and the spherical cage surface and is adapted to prevent excessive stress from being applied to the edge.

Specifically, a fixed-type constant velocity universal joint of the present invention comprises:

an outer joint member having a spherical inner surface with an open end and a plurality of track grooves formed on the spherical inner surface, the track grooves each extending along an axis direction toward the open end and equally spaced apart along the circumference of the spherical inner surface;

an inner joint member having a spherical outer surface and a plurality of track grooves corresponding to the track grooves of the outer joint member formed on the spherical outer surface, the track grooves each extending along the axis direction and equally spaced apart along the circumference of the spherical outer surface;

a plurality of balls received in the respective track grooves of the outer and inner joint members so as to transmit torque; and a cage for holding the plurality of balls, the cage arranged between the spherical inner surface of the outer joint member and the spherical outer surface of the inner joint member, the case having a spherical outer surface and a spherical inner surface, wherein:

a center of the spherical outer surface of the cage and a center of the spherical inner surface of the cage are oppositely offset from a center of the joint by an equal distance along the axis direction;

a wall of the cage, as viewed in longitudinal section, is relatively thick in an area adjacent to the open end of the outer joint member and is relatively thin in an area away from the open end;

the track grooves of the outer joint member each have a bottom linearly tapered in an area adjacent to the open end so that a depth of the grooves increases toward the open end;

the track grooves of the inner joint member each have a bottom linearly tapered in an area away from the open end so that a depth of the grooves decreases toward the end of the inner joint member opposite to the open end; and a plurality of pockets are arranged along the circumference of the cage and receive balls, an edge of the pocket being filleted on at least one of a spherical inner surface-side and a spherical outer surface-side of the cage.

In this type of fixed-type constant velocity universal joints, the edges of the ball-receiving pockets of the cage are preferably filleted on the spherical inner surface-side of the cage since interference primarily occurs between the rise formed along the track grooves of the inner joint member and the spherical inner surface of the cage. However, the edges of the pockets may also be filleted on the spherical outer surface-side of the cage. It is most preferred that the edges of the pockets are filleted both on the spherical inner surface-side and on the spherical outer surface-side of the cage.

As used herein, the term "filleted" refers to a continuous spherical surface that smoothly connects between the spherical inner surface or spherical outer surface of the cage and the end surface of the pockets. The fillet may be formed such that its cross section is either a single arc or a combined arc consisting of multiple arcs smoothly connected to one another.

This construction, in which the edges of the pockets are filleted on the spherical inner surface-side or on the spherical outer surface-side of the cage, prevents cracking and chipping of the edges of the pockets when the rise formed along the edge of the track grooves interferes with the spherical surfaces of the cage. As a result, the strength of the cage is ensured.

(5) The present invention achieves the above-described object by defining, of all the internal dimensions of fixed-type constant velocity universal joints, the optimum geometry of the cage that takes into account the interference between the rise formed along the edge of the track grooves and the spherical cage surface and is adapted to prevent excessive stress from being applied to the pockets at their corners away from the open end of the joint.

Specifically, a fixed-type constant velocity universal joint of the present invention comprises:

an outer joint member having a spherical inner surface with an open end and a plurality of track grooves formed on the spherical inner surface, the track grooves each extending along an axis direction toward the open end and equally spaced apart along the circumference of the spherical inner surface;

an inner joint member having a spherical outer surface and a plurality of track grooves corresponding to the track grooves of the outer joint member formed on the spherical outer surface, the track grooves each extending along the axis direction and equally spaced apart along the circumference of the spherical outer surface;

a plurality of balls received in the respective track grooves of the outer and inner joint members so as to transmit torque; and a cage for holding the plurality of balls, the cage arranged between the spherical inner surface of the outer joint member and the spherical outer surface of the inner joint member, the case having a spherical outer surface and a spherical inner surface, wherein:

a center of the spherical outer surface of the cage and a center of the spherical inner surface of the cage are oppositely offset from a center of the joint by an equal distance along the axis direction;

a wall of the cage, as viewed in longitudinal section, is relatively thick in an area adjacent to the open end of the outer joint member and is relatively thin in an area away from the open end;

the track grooves of the outer joint member each have a bottom linearly tapered in an area adjacent to the open end so that a depth of the grooves increases toward the open end;

the track grooves of the inner joint member each have a bottom linearly tapered in an area away from the open end so that a depth of the grooves decreases toward the end of the inner joint member opposite to the open end; and a plurality of substantially rectangular pockets that are arranged along the circumference of the cage and receive the balls have a radius of curvature at corners thereof away from the open end of the outer joint member, the radius of curvature being larger than at the corners adjacent to the open end and being smaller than a ball radius.

This construction, in which the radius of curvature at the corners of the pockets away from the open end of the joint is larger than the radius of curvature at the corners adjacent to the open end and is smaller than the ball radius, can reduce the stress applied to the corners of the pockets away from the open end of the joint when the rise formed along the edge of the track grooves interferes with the spherical cage surfaces. Thus, the stress balance can be optimized between the corners of the pockets away from the open end of the joint and the corners adjacent to the open end of the joint. This ensures cage strength.

If the pockets have a equal or smaller radius of curvature at the corners away from the open end of the joint to or than that at the corners adjacent to the open end of the joint, then it is difficult to reduce the excessive stress applied to the corners away from the open end. If the radius of curvature at the corners of the pockets away from the open end of the joint is equal to or larger than the ball radius, then the balls may interfere with the corners of the pockets away from the open end of the joint when the balls come into contact with the pillars between the pockets.

(6) The tapered track grooves of the present invention can result in a load applied to the pockets of the joint. When the cage rubs against the outer joint member while this load is applied to the pockets, heat is generated that can cause reduction in the durability or loss of the torque transmission. Thus, the present invention achieves the above-described objective by defining, of all the internal dimensions of fixed-type constant velocity universal joints, the optimum geometry of the cage that takes into account such reduction in the durability or loss of the torque transmission caused by the heat generation.

Specifically, a fixed-type constant velocity universal joint of the present invention comprises:

an outer joint member having a spherical inner surface with an open end and a plurality of track grooves formed on the spherical inner surface, the track grooves each extending along an axis direction toward the open end and equally spaced apart along the circumference of the spherical inner surface;

an inner joint member having a spherical outer surface and a plurality of track grooves corresponding to the track grooves of the outer joint member formed on the spherical outer surface, the track grooves each extending along the axis direction and equally spaced apart along the circumference of the spherical outer surface;

a plurality of balls received in the respective track grooves of the outer and inner joint members so as to transmit torque; and a cage for holding the plurality of balls, the cage arranged between the spherical inner surface of the outer joint member and the spherical outer surface of the inner joint member, the case having a spherical outer surface and a spherical inner surface, wherein:

a center of the spherical outer surface of the cage and a center of the spherical inner surface of the cage are oppositely offset from a center of the joint by an equal distance along the axis direction;

a wall of the cage, as viewed in longitudinal section, is relatively thick in an area adjacent to the open end of the outer joint member and is relatively thin in an area away from the open end;

the track grooves of the outer joint member each have a bottom linearly tapered in an area adjacent to the open end so that a depth of the grooves increases toward the open end;

the track grooves of the inner joint member each have a bottom linearly tapered in an area away from the open end so that a depth of the grooves decreases toward the end of the inner joint member opposite to the open end; and an end of the spherical outer surface of the cage adjacent to the open end of the joint is axially extended, and an end of the spherical inner surface of the cage adjacent to the open end of the joint is tapered so that the tapered surface has an increasing diameter toward the end of the spherical outer surface adjacent to the open end of the joint.

According to this invention, the end of the spherical outer surface of the cage adjacent to the open end of the joint is axially extended. Specifically, the end of the spherical outer surface of the cage adjacent to the open end of the joint is extended by an amount that prevents the shaft attached to the inner joint member from interfering with the end of the cage adjacent to the open end of the joint when the joint is operated at the maximum operating angle, at which the angle that the rotation axis of the outer joint member makes with the rotation axis of the inner joint member becomes largest.

When the end of the spherical outer surface of the cage adjacent to the open end of the joint is extended by an amount that prevents the shaft from interfering with the end of the cage adjacent to the open end of the joint, it is desired to taper the end of the spherical inner surface of the cage adjacent to the open end of the joint to a taper angle equal to, or larger than, half the maximum operating angle that the outer joint member makes with the inner joint member. The taper angle is preferably half the maximum operating angle of the joint or larger since the spherical outer surface of the cage is kept in contact with the spherical inner surface of the outer joint member in a sufficiently large area when the joint is operated at larger operating angles. If the taper angle is smaller than half the maximum operating angle of the joint, then the shaft will interfere with the tapered end of the cage adjacent to the open end of the joint.

That the spherical outer surface of the cage is kept in contact with the spherical inner surface of the outer joint member in a sufficiently large area ensures that the balls urge the cage toward the open end of the joint when the joint is operated at the maximum operating angle. As a result, the decrease in the durability or the loss of torque transmission caused by the generated heat can be minimized when the end of the spherical outer surface of the cage adjacent to the open end of the joint vigorously rubs against the spherical inner surface of the outer joint member. This construction also ensures maximum cage rigidity, so that the strength of the cage is also improved.

Accordingly, the operating angle of the joint can be readily increased. The large steering angle allows a larger steering angle for the front wheels of automobiles and, thus, helps keep the steering radius small. This meets the requirement for recently emerging automobiles that incorporate longer wheelbases to ensure large passenger space.

(7) The present invention achieves the above-described object by defining, of all the internal dimensions of fixed-type constant velocity universal joints, the optimum ranges for factors required to decrease the load applied to the track grooves of the outer and inner joint members as well as to the cage pockets in the 0 degree phase. This is done by investigating these factors by internal force analysis.

Specifically, a fixed-type constant velocity universal joint of the present invention comprises:

an outer joint member having a spherical inner surface with an open end and a plurality of track grooves formed on the spherical inner surface, the track grooves each extending along an axis direction toward the open end and equally spaced apart along the circumference of the spherical inner surface;

an inner joint member having a spherical outer surface and a plurality of track grooves corresponding to the track grooves of the outer joint member formed on the spherical outer surface, the track grooves each extending along the axis direction and equally spaced apart along the circumference of the spherical outer surface;

a plurality of balls received in the respective track grooves of the outer and inner joint members so as to transmit torque; and a cage for holding the plurality of balls, the cage arranged between the spherical inner surface of the outer joint member and the spherical outer surface of the inner joint member, the case having a spherical outer surface and a spherical inner surface, wherein:

a center of the spherical outer surface of the cage and a center of the spherical inner surface of the cage are oppositely offset from a center of the joint by an equal distance along the axis direction;

a wall of the cage, as viewed in longitudinal section, is relatively thick in an area adjacent to the open end of the outer joint member and is relatively thin in an area away from the open end;

the track grooves of the outer joint member each have a bottom linearly tapered in an area adjacent to the open end so that a depth of the grooves increases toward the open end;

the track grooves of the inner joint member each have a bottom linearly tapered in an area away from the open end so that a depth of the grooves decreases toward the end of the inner joint member opposite to the open end; and a center of the curvature of the track grooves of the outer joint member and a center of the curvature of the track grooves of the inner joint member are offset from a center of the joint by a cage offset amount by which a center of the spherical outer surface of the cage is offset from a center of the spherical inner surface of the cage, so that a track offset amount is zero.

This construction reduces the outer ring track load, or the load applied to the track grooves of the outer joint member when the joint is in the 0° phase. It also reduces the inner ring track load, or the load applied to the track grooves of the inner joint member when the joint is in the 0° phase. The load applied to the end of the cage pockets at the open end of the joint is minimized when the joint is in the 0° phase. This means that this type of fixed-type constant velocity universal joints is highly suitable for operation at larger operating angles.

If the center of the curvature of the spherical inner surface of the outer joint member is offset from the center of the curvature of the track grooves of the outer joint member, or if the center of the curvature of the spherical outer surface of the inner joint member is offset from the center of the curvature of the track grooves of the inner joint member, the depth of the track grooves will be decreased toward the deeper side of the outer joint member. As a result, the ball in its innermost position of the track groove may run off the groove when the joint is operated at larger operating angles.

By constructing the joint so that the track offset amount is zero, the depth of the track grooves will not be decreased toward the deeper side of the outer joint member. As a result, the ball in the innermost position of the track groove is prevented from running off the groove when the joint is operated at larger operating angles.

It is desired that in the fixed-type constant velocity universal joints described in (1) through (7) above, the ratio f/PCR have a value greater than zero and smaller than or equal to 0.12, given that the cage offset amount between the center of the spherical outer surface and the center of the spherical inner surface of the cage is f, and the length of the line segment connecting the center of the curvature of the track grooves of the outer joint member or the center of the curvature of the track grooves of the inner joint member with the ball center is PCR.

Setting the cage offset amount to a relatively large value is advantageous since the strength of the cage can be improved by increasing the thickness of the cage at its open end from which to insert the inner joint member. By increasing the thickness of the cage at its open end, the cage pockets can confine the balls and keep them from coming out of the outer joint member from its open end when the joint is operated at larger operating angles.

However, if the cage offset is too large, then the circumferential displacement of the balls within the cage pockets become large, so that the size of the cage pockets must be increased along the circumference of the cage in order to ensure proper movement of the balls. As a result, the width of the pillars of the cage is decreased, resulting in a decreased strength of the cage. Furthermore, the thickness of the cage is decreased in the area away from its open end. This also results in a decreased strength of the cage.

Thus, too large a cage offset amount is not desirable and an optimum range exists for the cage offset amount in terms of balancing between the advantages of the cage offset amount and the strength of the cage. However, the optimum range for the cage offset amount can vary depending on the size of the joint and must therefore be determined by considering the base dimensions of the joint that are reflecting the size of the joint.

To this end, the ratio f/PCR of the cage offset amount f to the length PCR of the line segment that connects the center of the curvature of the track grooves of the outer joint member or the center of the curvature of the track grooves of the inner joint member with the ball center is used.

Thus, the cage offset amount in the above-described construction is preferably set such that the ratio f/PCR has a value greater than zero and smaller than or equal to 0.12, given that the cage offset amount is f and the length of the line segment connecting the center of the curvature of the track grooves of the outer joint member or the center of the curvature of the track grooves of the inner joint member with the ball center is PCR. Since the cage offset amount f is a function of the difference in the thickness of the cage wall as viewed in the longitudinal section, it is preferably determined by considering this amount.

If the ratio f/PCR is greater than 0.12, then the above-described problems concerning the strength may arise. Conversely, if the ratio is smaller than or equal to zero, then the advantages of the cage offset amount may be lost. The cage offset, which is intended to prevent the contact point of the balls at the open end of the outer joint member from coming out of the cage pocket when the joint is operated at larger operating angles, cannot achieve its desired purpose when it has a value equal to or less than zero. Thus, the optimum range for the cage offset amount f is such that the ratio f/PCR is equal to or smaller than 0.12 in order to ensure the strength and durability of the cage.

In the fixed-type constant velocity universal joints described in (1) through (7) above, the track grooves of the outer and inner joint members are preferably finished by cold forging. The finishing of the tapered track grooves with cold forging facilitates removal of the mold. Thus, the employment of cold forging not only improves workability but also reduces the manufacturing cost.

DETAILED DESCRIPTION OF THE PREFERRED EMBODIMENTS

Figure 1:
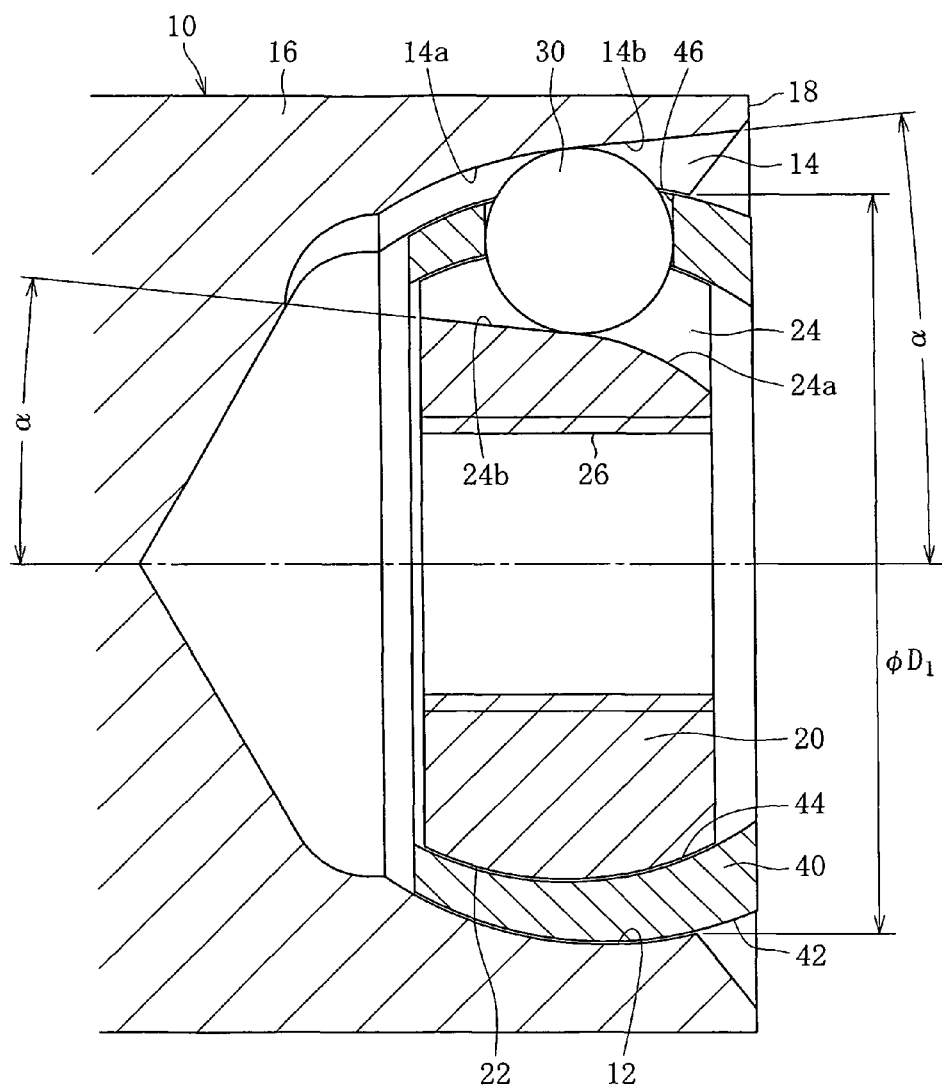
FIG. 1 is a longitudinal sectional view showing one embodiment of a fixed-type constant velocity universal joint in accordance with the present invention.

Referring to FIG. 1, a fixed-type constant velocity universal joint comprises an outer ring 10, an inner ring 20, a ball 30 and a cage 20. The fixed-type constant velocity universal joint connects two shafts to be connected. For example, a driven shaft (not shown) is connected to the outer ring 10, to which a driving shaft (not shown) is connected so that the torque is transmitted at constant velocity from the driving shaft to the driven shaft when the two shafts are at an angle to each other. FIG. 1 shows the state in which the operating angle θ that the rotation axis X of the outer ring 10 makes with the rotation axis Y of the inner ring 20 is 0°, whereas FIG. 1 shows the state in which the operating angle θ is at its maximum.

The outer ring 10 to serve as the outer joint member consists of a mouth portion 16 and a stem portion (not shown) that is coupled to the driving shaft in a torque-transmitting manner. The mouth portion 16 is essentially a cup with an open end and has a spherical inner surface 12 that has a plurality of axially extending, circumferentially equally spaced track grooves 14 formed thereon. Each track groove 14 extends to the open end 18 of the mouth portion 16.

The inner ring 20 to serve as the inner joint member has a spherical outer surface 22 that includes a plurality of axially extending, circumferentially equally spaced track groves 24 formed thereon. Each track groove 24 is axially cut across the inner ring 20. The inner ring 20 has a splined bore 26 to connect the inner ring to the driving shaft in a torque-transmitting manner.

The track grooves 14 of the outer ring 10 are formed to correspond to the track grooves 24 of the inner ring 20. Each pair of corresponding grooves 14, 24 forms a ball track in which a ball 30 is rollably received to transmit torque. In other words, the balls 30 are arranged between the track grooves 14 of the outer ring 10 and the track grooves 24 of the inner ring 20 to transmit torque from the inner ring to the outer ring. The balls 30 are received in corresponding pockets 46 arranged along the circumference of the cage 40. The number of the balls 30 and thus, the number of the track grooves 14, 24 may be any suitable number, for example, 6 or 8.

The cage 40 is slidably arranged between the outer ring 10 and the inner ring 20 and has a spherical outer surface 42 in contact with the spherical inner surface 12 of the outer ring 10 and a spherical inner surface 44 in contact with the spherical outer surface 22 of the inner ring 20. The curvature of the spherical inner surface 12 of the outer ring 10 and the curvature of the spherical outer surface 42 of the cage 40 have the same center (denoted by '$O_4$' in FIG. 2). Similarly, the curvature of the spherical outer surface 22 of the inner ring 20 and the curvature of the spherical inner surface 44 of the cage 40 have the same center (denoted by '$O_3$' in FIG. 2). Throughout the drawings, the gap between the spherical inner surface 12 of the inner ring 10 and the spherical outer surface 42 of the cage 40 is shown out of scale for clarity, as is the gap between the spherical outer surface 22 of the inner ring 20 and the spherical inner surface 44 of the cage 40.

Each of the track grooves 14 of the outer ring 10 includes an arc portion 14a and a linear portion 14b with the arc portion 14a formed on the deeper side, or on the side away from the open end of the mouth portion 16, and the linear portion 14b on the side of the open end. Each track groove 14 has its bottom linearly tapered by an angle α in the area adjacent to the open end 18 so that the depth of the groove increases toward the open end 18.

Each of the track grooves 24 of the inner ring 20 includes an arc portion 24a and a linear portion 24b with the arc portion 24a formed on the open end side of the outer ring 10 and the linear portion 24b on the side away from the open end. Each track groove 24 has its bottom linearly tapered by an angle α in the area away from the open end so that the depth of the groove increases toward the end opposite to the open end.

Figure 2:
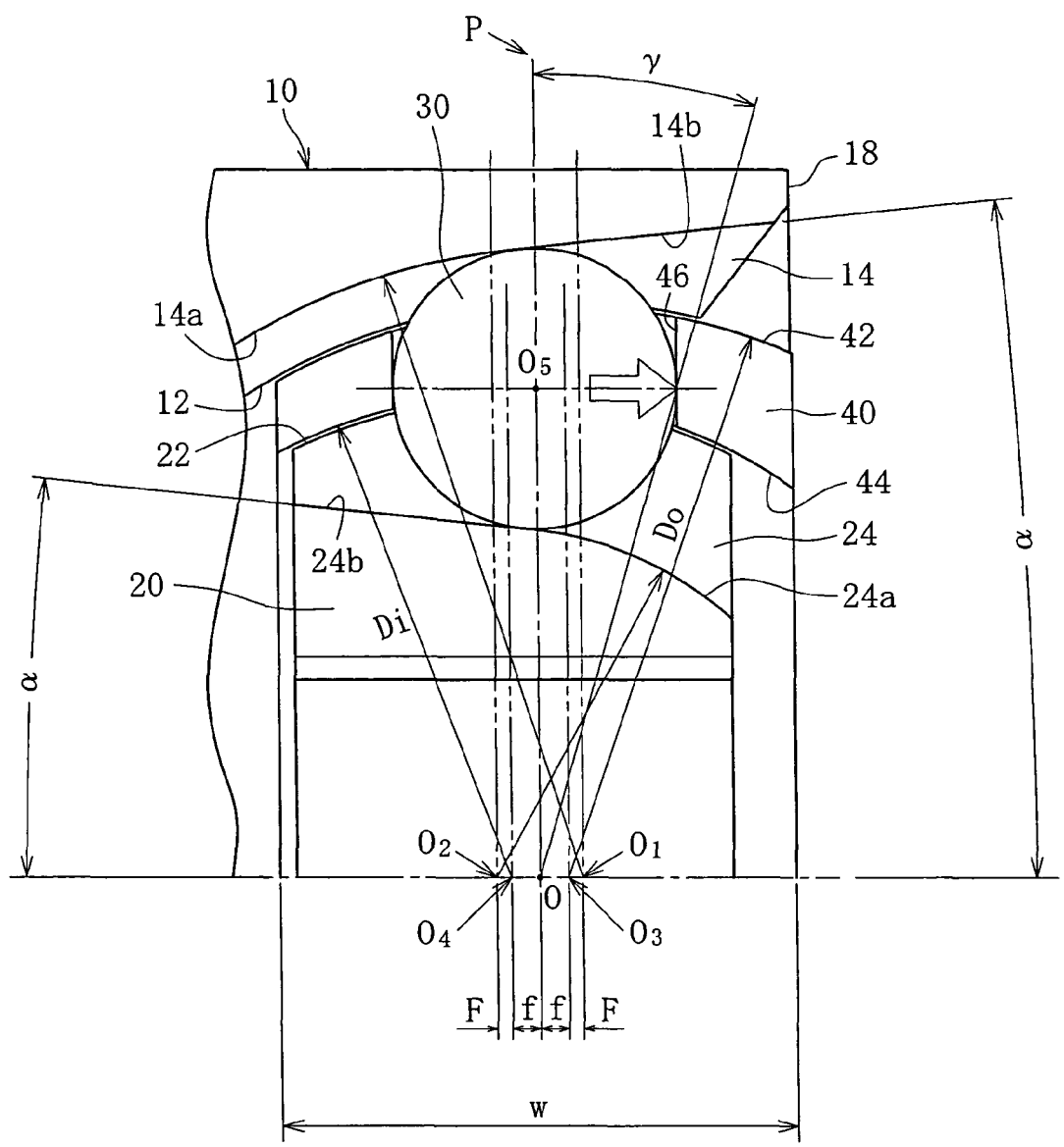
FIG. 2 is an enlarged view of major components of the joint of FIG. 1.

This joint has a construction as shown in FIG. 2 to ensure large operating angle θ of the joint. Specifically, as depicted in FIG. 2, the center of the curvature $O_1$ of the track grooves 14 of the outer ring 10 is offset from the center $O_3$ of the spherical inner surface 12 by a distance F, and the center of the curvature $O_2$ of the track grooves 24 of the inner ring 20 is offset from the center $O_4$ of the spherical outer surface 22 by the same distance F (i.e., Track offset). The center of the curvature $O_1$ and the center of the curvature $O_2$ are offset from the corresponding centers of the spherical surfaces in the axially opposite direction.

Similarly, the center of the curvature $O_3$ of the spherical outer surface 42 of the cage 40 and the center of the curvature $O_4$ of the spherical inner surface 44 of the cage 40 are oppositely offset from the center of the joint O by an equal distance f along the axis direction (i.e., cage offset).

Figure 3:
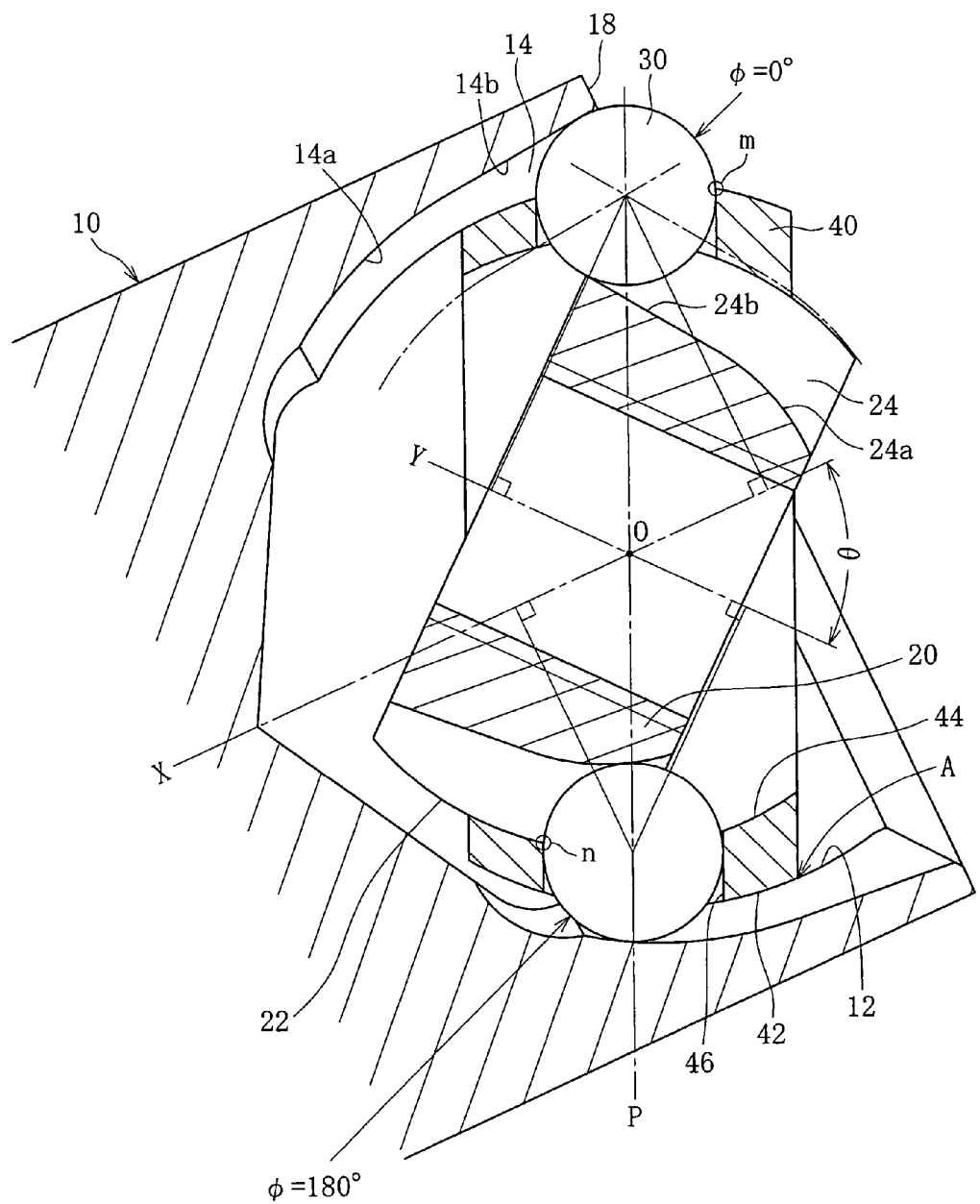
FIG. 3 is a longitudinal sectional view showing the joint of FIG. 1 operated at its maximum operating angle.

As depicted in FIG. 3, when the rotation axis X of the outer ring 10 makes an operating angle θ (other than 0°) with the rotation axis Y of the inner ring 20 and all of the balls 30 are in the midplane P of the joint, that is, the plane perpendicular to the bisecting-line of the angle θ between the two rotation axes X and Y, the center of each ball is equally distant from the two rotation axes X and Y, so that rotation is transmitted from the rotation axis Y to the rotation axis X at constant angular velocity. The intersection of the midplane P of the joint with the rotation axes X and Y is designated as the joint center O. In fixed-type constant velocity universal joints, the joint center O is fixed at any operating angle θ.

Each of the ball tracks formed by the corresponding pairs of track grooves 12, 24 of the outer ring 10 and the inner ring 20 has a "wedge-like" shape with the narrow end relatively inside the mouth portion 16 of the outer ring 10 gradually widening toward the open end of the outer ring 10. When the joint is operated at an operating angle θ to transmit torque, a force is applied to the ball 30 that urges the ball from the narrow end to the wide end of the wedge-like ball track (indicated in FIG. 2 by a blank arrow). The load exerted by this urging force upon the wall of the pockets 46 of the cage 40 is referred to as "pocket load," hereinafter.

The present joint is designed to have a larger cage offset amount f as compared to conventional universal joints so that the cage 40 serves to confine the balls 30 and keep them from coming out of the mouth portion 16 of the outer ring 10 from the open end 18 when the joint is operated at the maximum operating angle. Specifically, the cage offset amount f is determined so that the ratio f/PCR has a value greater than 0 and smaller than or equal to 0.12, given that the radius of the trajectory of the center of the ball 30 (or the length of the line segment connecting the center of the curvature $O_1$ of the track grooves 14 of the outer ring 10 or the center of the curvature $O_2$ of the track grooves 24 of the inner ring 20 with the center $O_5$ of the ball 30) is PCR.

The construction in which the track grooves 14 of the outer ring 10 and the track grooves 24 of the inner ring 20 have the tapered bottom not only allows the joint to operate with the larger maximum operating angle, but it also ensures that the balls 30 are kept in contact with the outer ring 10 within the corresponding track grooves 14 over a sufficient length. As a result, stable torque transmission between the outer ring 10 and the inner ring 10 is achieved.

This construction is also advantageous when the joint is operated at larger operating angles θ since the track load and the pocket load exerted by the ball 30 in the phase where it is most likely to come out of the cage pocket (phase angle φ=0°, See FIGS. 3 and 4) can be minimized. The term "track load" as used herein refers to the load exerted by the contacting ball 30 upon the wall of the track grooves 14, 24.

Since the spherical outer surface 42 of the cage 40 is guided by the spherical inner surface 12 of the outer ring 10 and the spherical inner surface 44 of the cage 40 is guided by the spherical outer surface 22 of the inner ring 20, a spherical force (i.e., force acting between spherical surfaces) acts between the cage 40 and the outer ring 10 or the inner ring 10 during torque transmission. The above-described construction lowers the maximum value of the spherical force and thus decreases the heat generated within the joint. In addition, this construction facilitates removal of the mold, ensuring high workability during cold forging and reducing manufacturing cost.

As the operating angle of the joint is increased during operation, the force with which the ball 30 urges the cage 40 toward the open end (i.e., pocket load) increases (indicated in FIG. 2 by blank arrow). This force is particularly significant when the ball is in or near its innermost position (Phase angle φ=180°). As a result, the spherical outer surface 42 of the cage 40 is vigorously rubbed against the spherical inner surface 12 of the outer ring 10 in the area adjacent to the open end of the outer ring (indicated in FIG. 3 by "A"). At this point, if the cage 40 is in contact with the outer ring 10 only in a small area, a significant amount of heat is generated, causing reduced durability and the loss of torque transmission.

Figure 5:
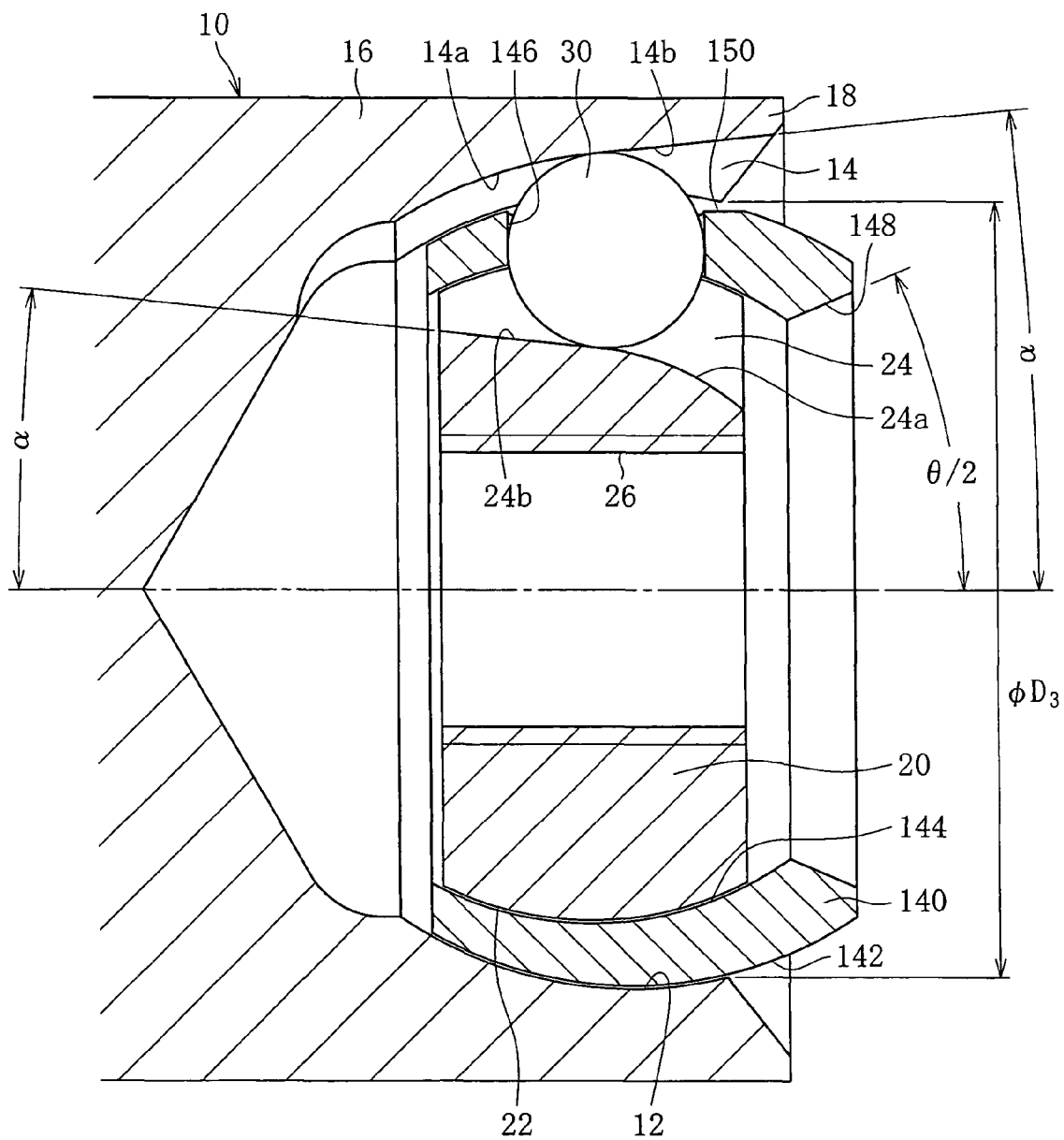
FIG. 5 is a longitudinal sectional view showing another embodiment of a fixed-type constant velocity universal joint in accordance with the present invention.
Figure 6:
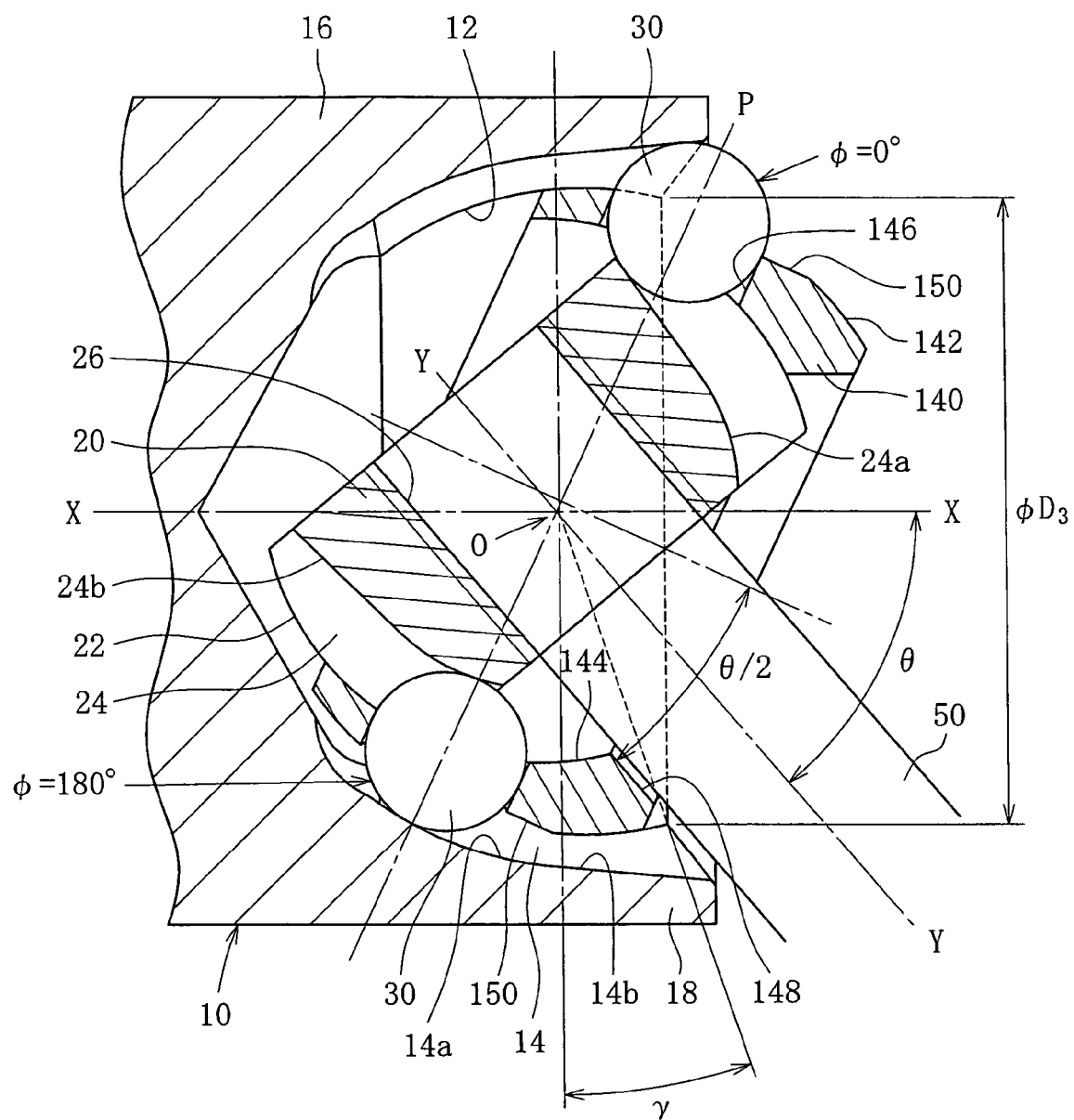
FIG. 6 is a longitudinal sectional view showing the joint of FIG. 5 operated at the maximum operating angle.

To prevent this heat generation during the rubbing of the cage 40 against the outer ring 10 and subsequent decrease in the durability and loss of torque transmission, the geometry of the cage is optimized as in the joint shown in FIG. 5. In FIG. 5, components other than the cage are denoted by the same numerals as in FIG. 1 and the same description will not be repeated: The two joints are different only in the geometry of the cage. FIG. 5 illustrates the state in which the operating angle θ that the rotation axis X of the outer ring 10 makes with the rotation axis Y of the inner ring 20 is 0°, while FIG. 6 illustrates the state in which the operating angle θ is largest.

In the cage 140 of the joint shown in FIG. 5, the end of the spherical outer surface 142 adjacent to the open end of the outer ring is axially extended, in contrast to the cage 40 of the joint shown in FIG. 1, and a tapered surface 148 is formed at the end of the spherical inner surface 144 adjacent to the open end of the outer ring. The surface 148 is tapered in such a manner that the tapered surface has an increasing diameter toward the end of the spherical outer surface 142 adjacent to the open end of the outer ring (FIGS. 1 and 5). As shown in FIG. 6, the end of the spherical outer surface 142 of the cage 140 adjacent to the open end of the outer ring 20 is extended by an amount that prevents the interference of the shaft 50, which is attached to the inner ring 20 via spline engagement, with the end of the cage 140 adjacent to the open end of the outer ring while the outer ring 10 makes the maximum operating angle with the inner ring 20.

When the end of the spherical outer surface 142 of the cage 140 adjacent to the open end of the outer ring is extended by an amount that prevents the shaft 50 from interfering with the end of the cage 140 adjacent to the open end of the outer ring, it is also desired to taper the tapered surface 148 at the end of the spherical inner surface 144 of the cage 140 adjacent to the open end of the outer ring to an angle θ/2 equal to, or larger than, half the maximum angle θ that the outer ring 10 makes with the inner ring 20.

If the taper angle θ/2 of the tapered surface 148 is half the maximum operating angle θ or larger, then the spherical outer surface 142 of the cage 140 is kept in contact with the spherical inner surface 12 of the outer ring 10 in a sufficiently large area when the joint is operated at larger operating angles. If the taper angle θ/2 is smaller than half the maximum operating angle θ, then the shaft 50 will interfere with the end of the cage 140 adjacent to the open end of the outer ring.

That the spherical outer surface 142 of the cage 140 is kept in contact with the spherical inner surface 12 of the outer ring 10 in a sufficiently large area ensures that the balls 30 urge the cage 140 toward the open end when the joint is operated at the maximum operating angle θ. As a result, the decrease in the durability or the loss of torque transmission caused by the generated heat can be minimized when the end of the spherical outer surface 142 of the cage 140 adjacent to the open end of the outer ring vigorously rubs against the spherical inner surface 12 of the outer ring 10. This construction also ensures maximum rigidity of the cage 140, so that the strength of the cage 140 is also improved.

Figure 7:
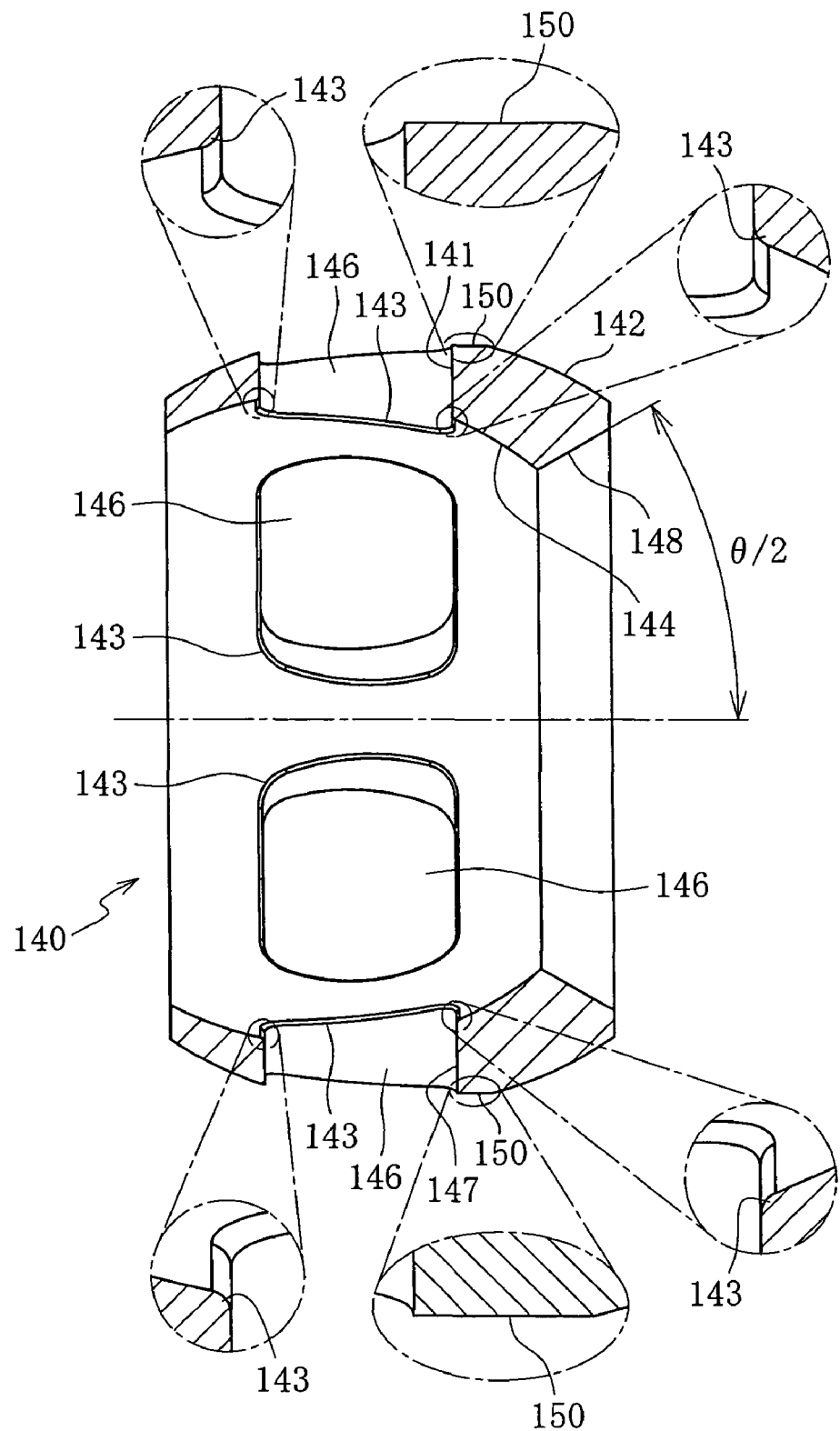
FIG. 7 is a longitudinal sectional view showing the cage having filleted edges on the spherical inner surface thereof.

In the cage 140 of the joint shown in FIG. 5, the edge 143 of the pocket 146 that connects the spherical inner cage surface 144 to the end surface 141 of the pocket 146 may be filleted to form, for example, spherical R curve, as shown in FIG. 7. The spherical R curve is a continuous spherical surface that smoothly connects between the spherical inner surface 144 of the cage 140 and the end surface 141 of the pocket 146. The edge 143 on the spherical inner surface-side of the cage is formed along the entire circumference of the pocket 146.

Figure 8:
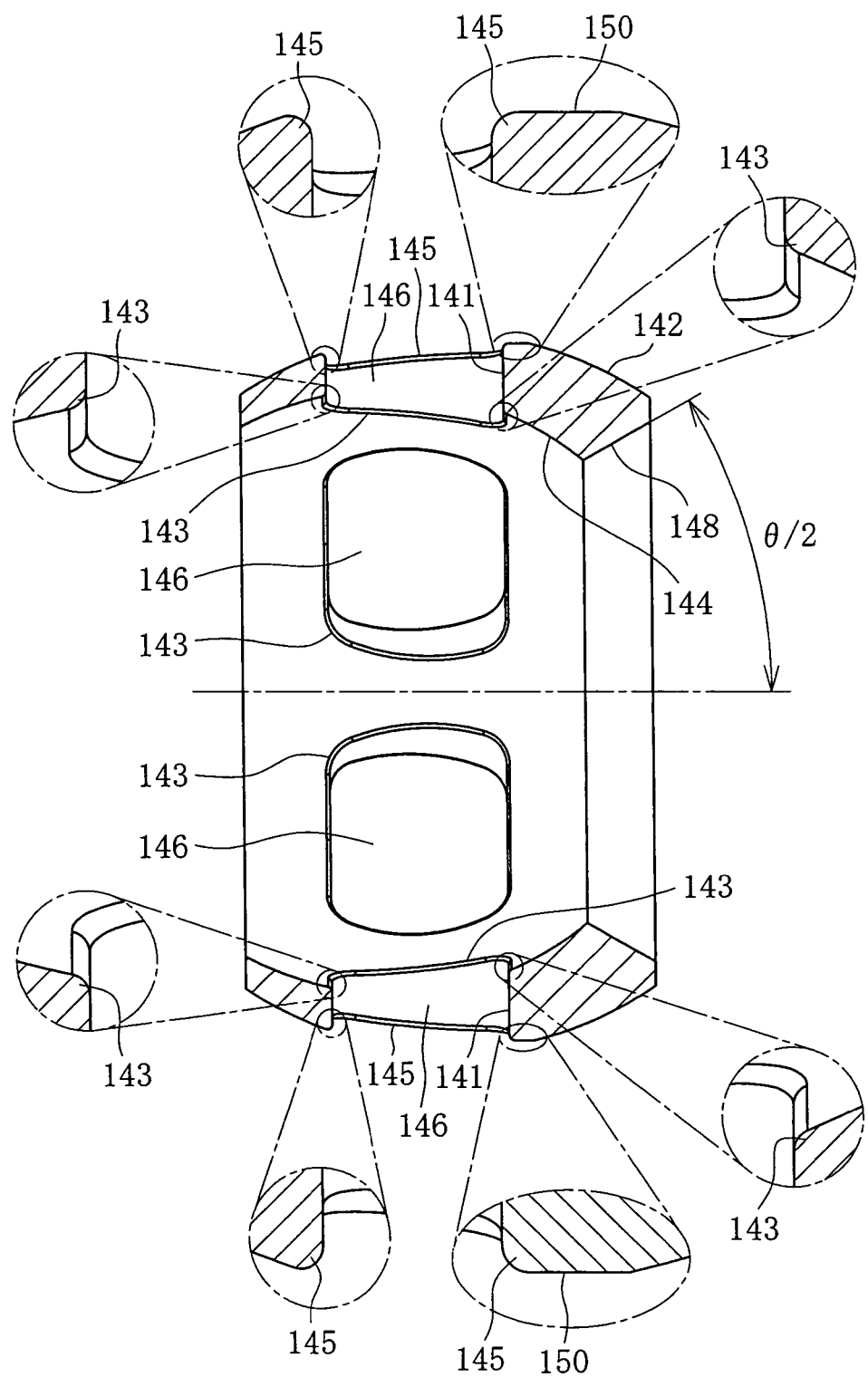
FIG. 8 is a longitudinal sectional view showing the cage having filleted edges on the spherical inner surface and spherical outer surface thereof.

FIG. 8 shows one embodiment in which the edge 143 on the cage spherical inner surface-side of the pocket 146 is formed as spherical R curve as is the edge 145 on the cage spherical outer surface-side. The spherical R curve of the edge 145 on the cage spherical outer surface-side is also a continuous spherical surface that smoothly connects between the spherical outer surface 142 of the cage 140 and the end surface 141 of the pocket 146. The edge 145 is also formed along the entire circumference of the pocket 146.

This construction, in which the edges 143, 145 of the pockets 146 are formed as spherical R curve on the spherical inner surface-side or on the spherical outer surface-side of the cage, prevents cracking and chipping of the edges 143, 145 of the pockets 146 when dynamic twisting torque higher than the permissive level is applied to the joint and the rise formed along the edge of the track grooves of the outer ring 10 and the inner ring 20 interferes with the spherical inner surface 144 and the spherical outer surface 142 of the cage 140. As a result, the strength of the cage 140 is ensured.

While in the above-described embodiment, the construction in which the edges 143, 145 on the cage spherical inner surface-side or on the cage spherical outer surface-side of the pockets 146 are formed as spherical R curve is applied to the cage 140 of the joint shown in FIG. 5, the same construction may be applied to the cage 40 of the joint shown in FIG. 1.

Due to the cage offset, the wall of the cage 140 is relatively thick in the area adjacent to the open end of the outer ring 10 and is relatively thin in the area away from the open end. The cage 140 includes a plurality of substantially rectangular pockets 146 arranged along its circumference with each pocket 146 having four corners: two "thin area-side" corners 147 and two "thick area-side" corners 149.

Figure 9:
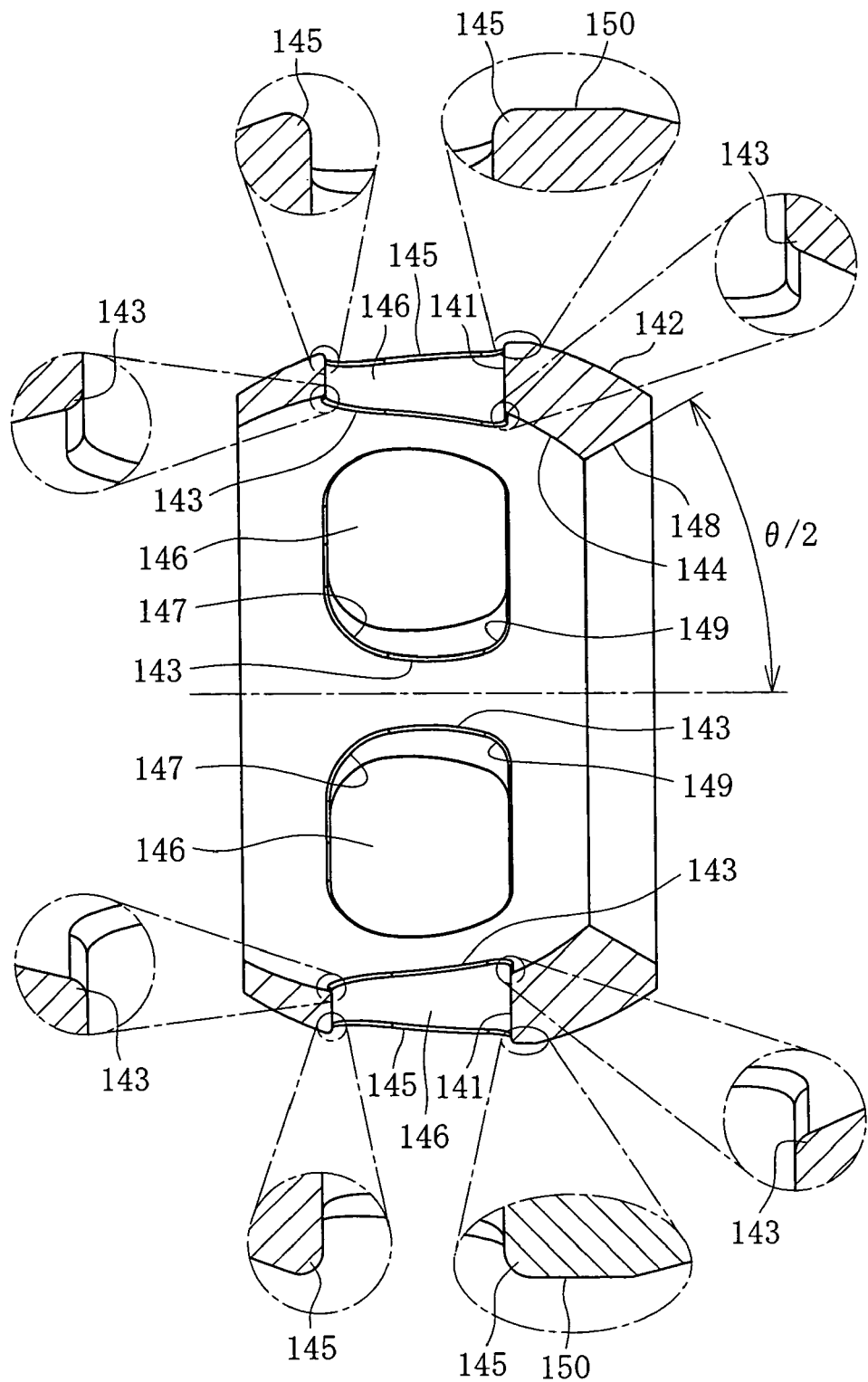
FIG. 9 is a longitudinal sectional view showing the cage having filleted edges on the spherical inner surface and spherical outer surface thereof with the pockets having a larger radius of curvature at the corners on the thinner side of the cage than at the corners on the thicker side of the cage.
Figure 10:
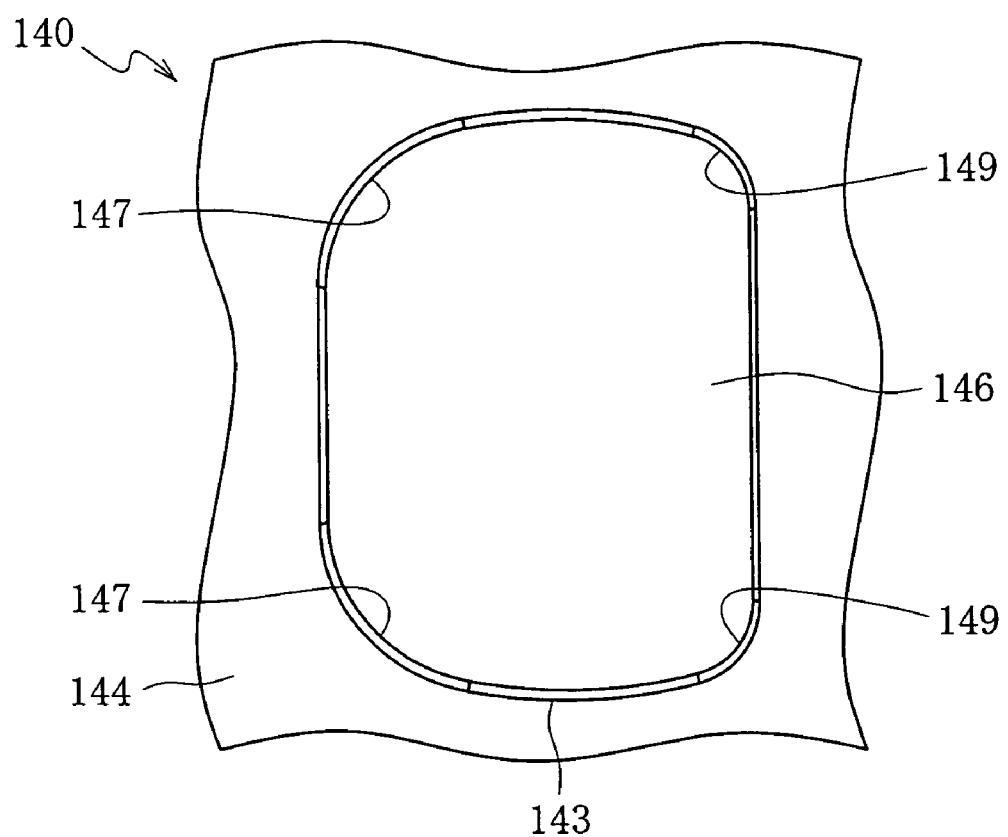
FIG. 10 is a partially enlarged plan view showing the pocket with the corners on the thinner and thicker sides.

FIG. 9 shows one embodiment in which each pocket 146 of the cage 140 has a larger radius of curvature at the thin area-side corners 147 thereof than at the thick area-side corners 149 and the radius of curvature is smaller than the radius of the ball 30. A single pocket 146 is shown in FIG. 10 in its planer view for easy comparison of the radius of curvature between the thin area-side corners 147 and the thick area-side corners 149 of the pocket 146.

Figure 11:
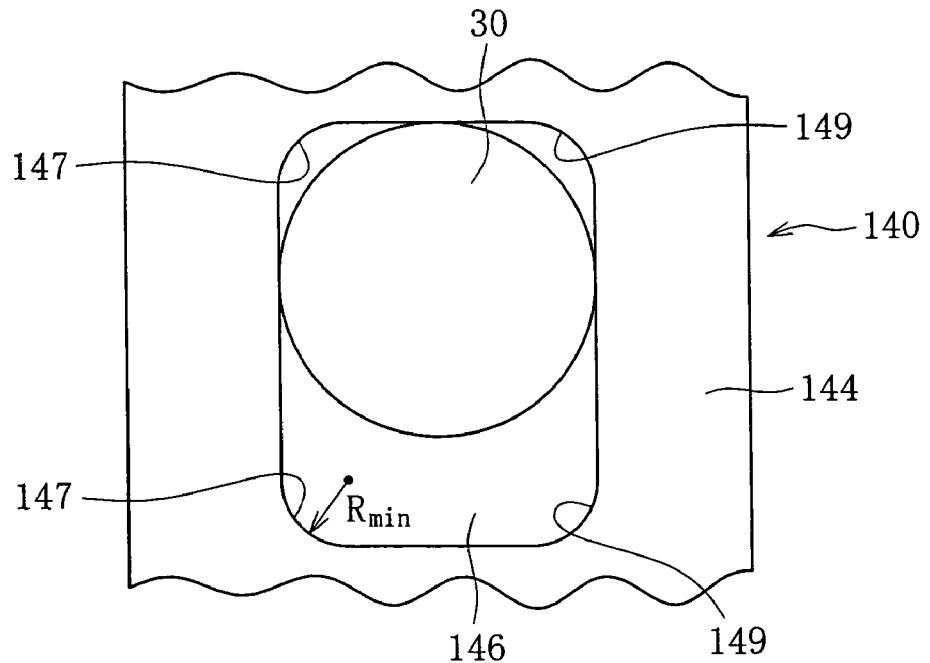
FIG. 11 is a partially enlarge plan view showing the pocket having the minimum radius of curvature at the corners on the thinner side.
Figure 12:
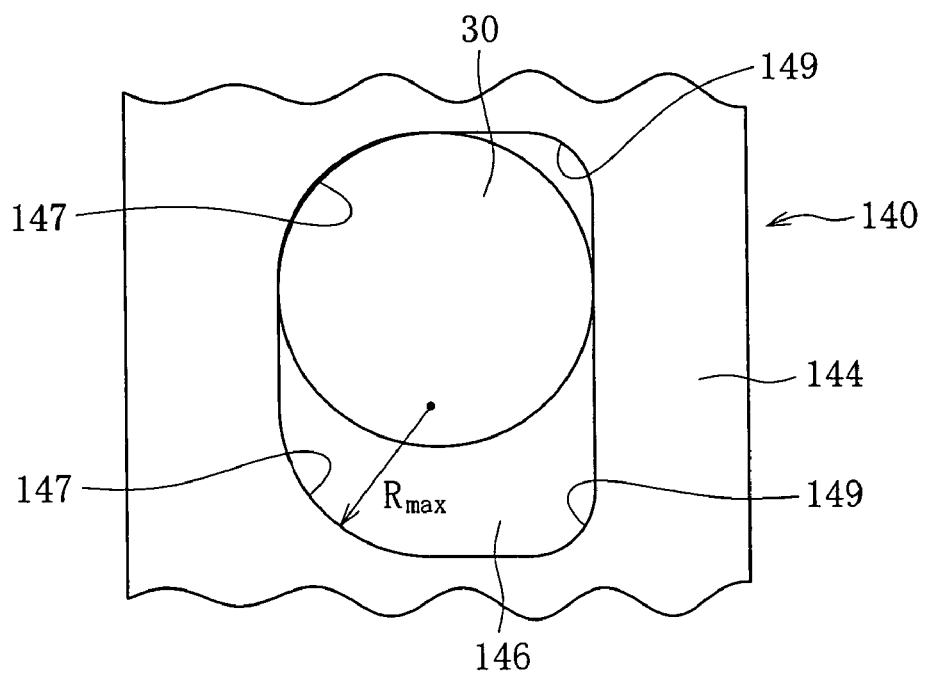
FIG. 12 is a partially enlarge plan view showing the pocket having the maximum radius of curvature at the corners on the thinner side.

FIG. 11 shows another embodiment in which the thin area-side corners 147 of the pocket 146 have a minimum radius of curvature ($R_{min}$) which is the same radius of curvature as the thick area-side corners 149. FIG. 12 shows another embodiment in which the thin area-side corners 147 of the pocket 146 have a maximum radius of curvature ($R_{max}$), which is the same radius as the ball 30.

This construction, in which the radius of curvature at the thin area-side corners 147 of the pockets 146 is larger than the radius of curvature at the thick area-side corners 149 and is smaller than the radius of the ball 30, can reduce the stress applied to the thin area-side corners 147 of the pockets 146 when the rise formed along the edge of the track grooves interferes with the spherical inner surface 144 and the spherical outer surface 142 of the cage 140 and confines the movement of the cage 140. As a result, the stress balance can be optimized between the thin area-side corners 147 and the thick area-side corners 149. This ensures the strength of the cage 140.

An FEM analysis has revealed that increasing the radius of curvature at the thin area-side corners 147 of the pockets 146 can decrease the stress exerted there, so that the stress exerted at the thin area-side corners 147 and the stress exerted at the thick area-side corners 149 come close to each other, achieving optimum stress balance. As a result, the tolerance margin for the breaking of the cage 140 is increased and strength of the joint during operation at larger operating angles is ensured in the case where the rise formed along the edge of the track grooves interferes with the spherical inner surface 144 and the spherical outer surface 142 of the cage 140 to confine the cage 140.

While the construction in which the radius of curvature at the thin area-side corners 147 of the pockets 146 is larger than the radius of curvature at the thick area-side corners 149 and is smaller than the radius of the ball 30 has been described with reference to the cage 140 of the joint shown in FIG. 5, the same construction can be applied to the cage 40 of the joint shown in FIG. 1.

In the joint shown in FIG. 1, the track offset is relatively small, whereas the cage offset is relatively large to ensure operation of the joint at larger operating angles. Due to the small track offset, the track grooves 14 of the outer ring 10 can be constructed to have sufficient depth in the deeper side area. This helps prevent the ball 30 in the innermost position of the track groove 14 from running off the groove.

Figure 4:
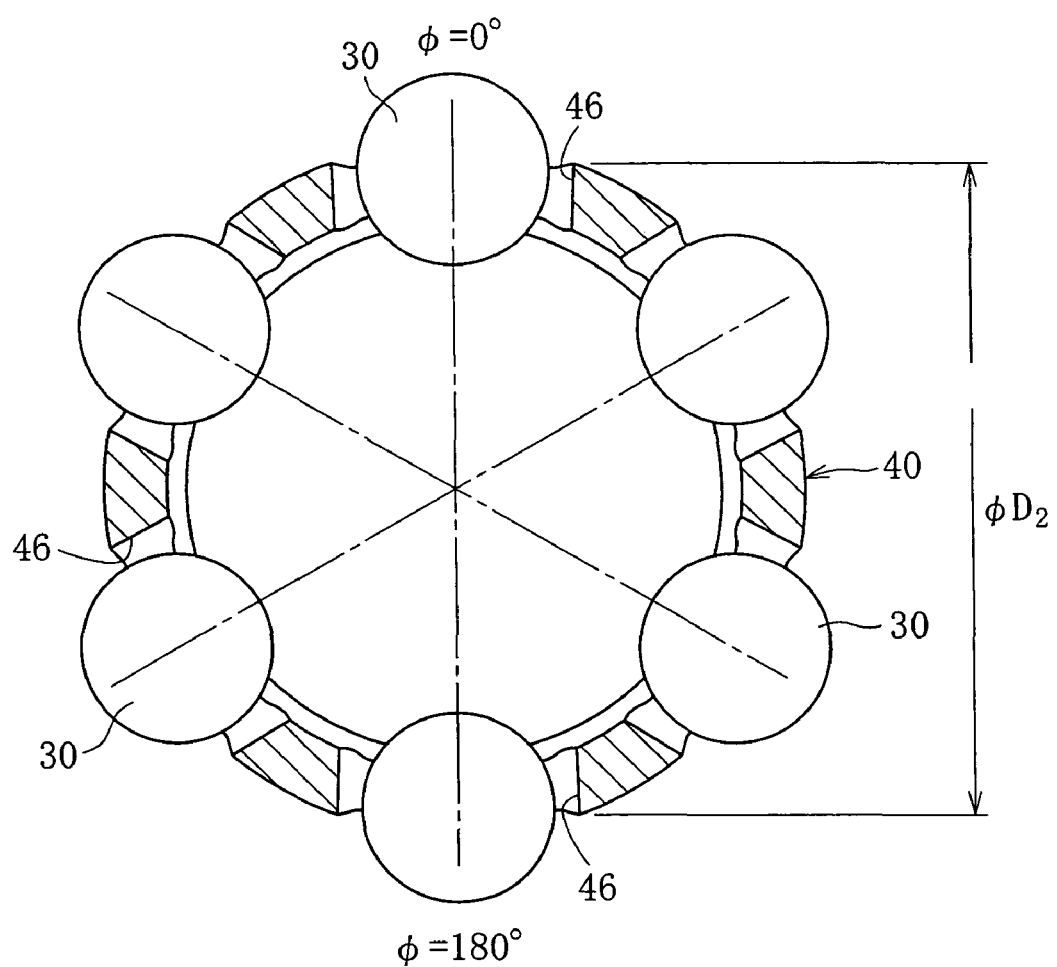
FIG. 4 is a transverse sectional view showing the cage of FIG. 1.

However, the small track offset results in a small embrace angle (spherical angle) γ, the angle by which the outer ring 10 embraces the cage 40 (see FIG. 2). Specifically, the term "embrace angle (spherical angle) γ" refers to the angle that the end of the spherical inner surface 12 of the outer ring 10 adjacent to the open end makes with the joint midplane P. In order to facilitate the assembly of the cage 40 with the outer ring 10 in this type of joint, the spigot diameter $\phi D_1$ of the outer ring 10 (FIG. 1) is made equal to or larger than the outermost diameter $\phi D_2$ of the cage 40 (FIG. 4). This, however, makes the embrace angle (spherical angle) γ of the outer ring 10 even smaller. As a result, the strength and durability of the joint may be decreased and torque transmission may be lost.

To facilitate the assembling of the cage with the outer ring without decreasing the strength or durability of the joint or losing torque transmission, the geometry of the cage 140 is optimized as in the joint shown in FIG. 5. The cage 140 of FIG. 5 as viewed from the opposite side of the open end of the outer ring 10 is shown in FIG. 13 and a sectional view of FIG. 13 is shown in FIG. 14.

Specifically, the cage 140 of the joint shown in FIG. 5 has part of its spherical outer surface 142 cut on the open end side of each pocket 146 to form a planar cut face 150. In addition, the outer diameter $\phi D_4$ of the cage 140 across the two opposing planar cut faces 150 (see FIGS. 13 and 14) is smaller than the spigot diameter $\phi D_3$ of the outer ring 10 (see FIGS. 5 and 6). As depicted in FIG. 6, part of the spherical outer surface 142 is cut on the open end side of the pockets 146 so that the contact point of the cage with the ball 30 exists when the joint is operated at the rotation axis X of the outer ring 10 making the maximum operating angle θ with the rotation axis Y of the inner ring 20.

That the contact point of the cage with the ball 30 exists is equivalent to that the ball 30, when in the phase in which it is most likely to come out of the pocket 146 of the cage 140 (phase angle φ=0°), is kept from doing so while the joint is operated at the maximum operating angle θ.

Figure 13:
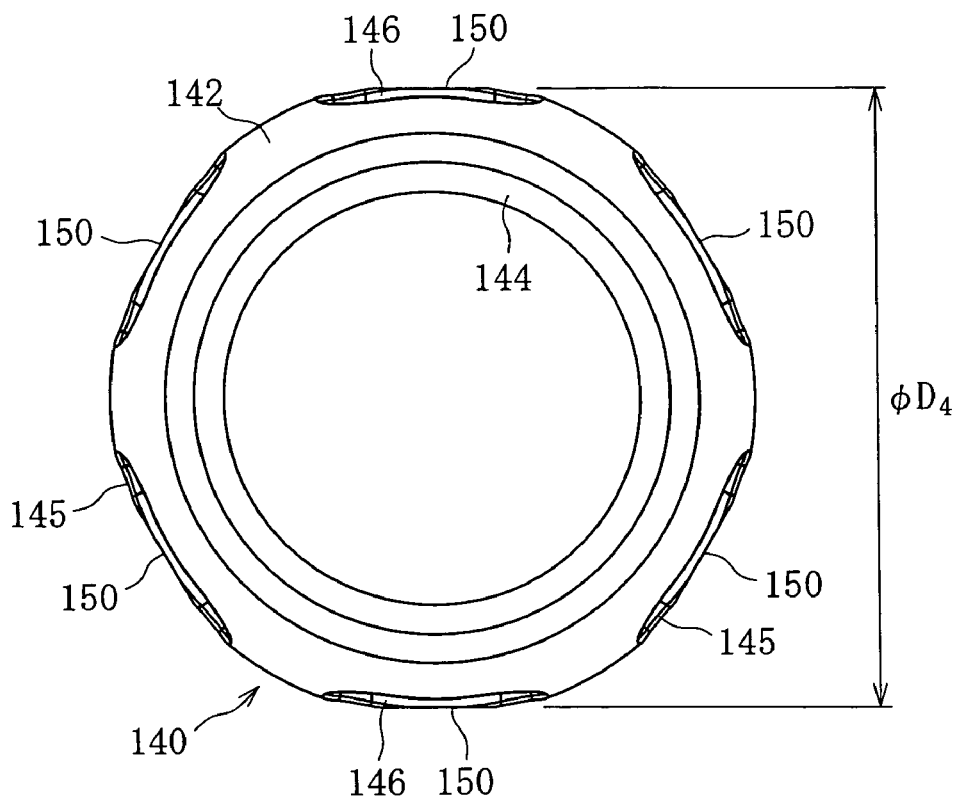
FIG. 13 is a side view of the cage of FIG. 5 as viewed from the side opposite to the open end of the outer ring.
Figure 14:
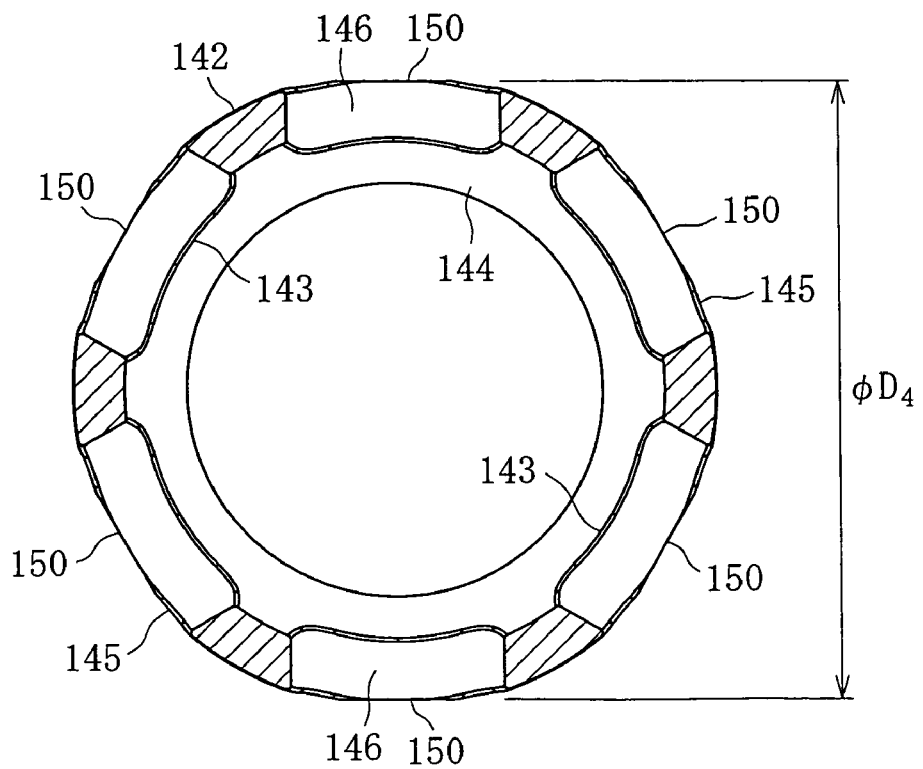
FIG. 14 is a cross sectional view of FIG. 13.

While in this embodiment, the cut face 150 is formed for each of the circumferentially equally spaced pockets 146 as shown in FIG. 13 and FIG. 14, the cut face may not be formed for each pocket 146: It may be formed for at least an opposing pair of the pockets 146.

Figure 15:
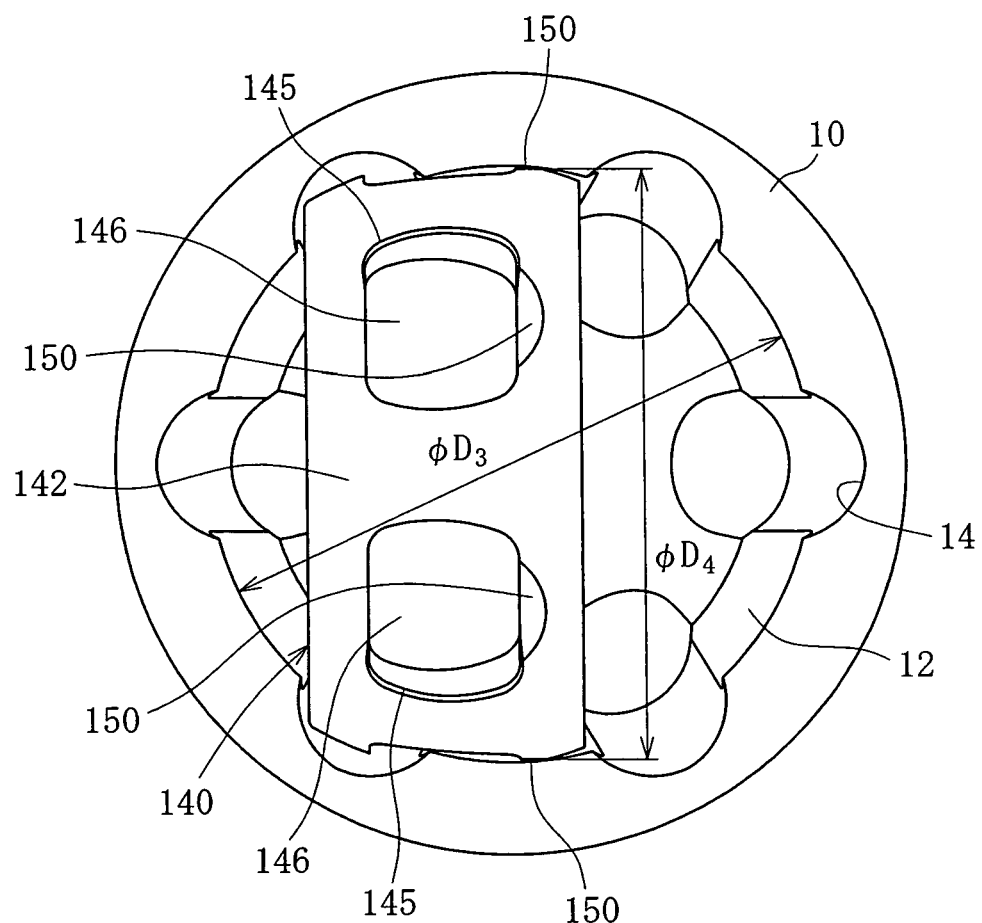
FIG. 15 is a side view of the outer ring as viewed from the open end side, illustrating the manner in which the cage is assembled with the outer ring.

The reason that the cut is made for at least two opposing pockets 146 is as follows: During assembly of the cage 140 with the outer ring 10 as depicted in FIG. 15, the cage 140 is first inserted into the outer ring 10 with its axis kept perpendicular to the axis of the outer ring 10. After insertion into the outer ring 10, the cage 140 is turned by 90° so that its axis is aligned with the axis of the outer ring 10. The insertion of the cage 140 into the outer ring 10 is possible if the partial cut is made for at least two opposing pockets 146 and the outer diameter $\phi D_4$ of the cage 140 across the two planar cut faces 150 is smaller than the spigot diameter $\phi D_3$ of the outer ring 10.

Figure 16A:
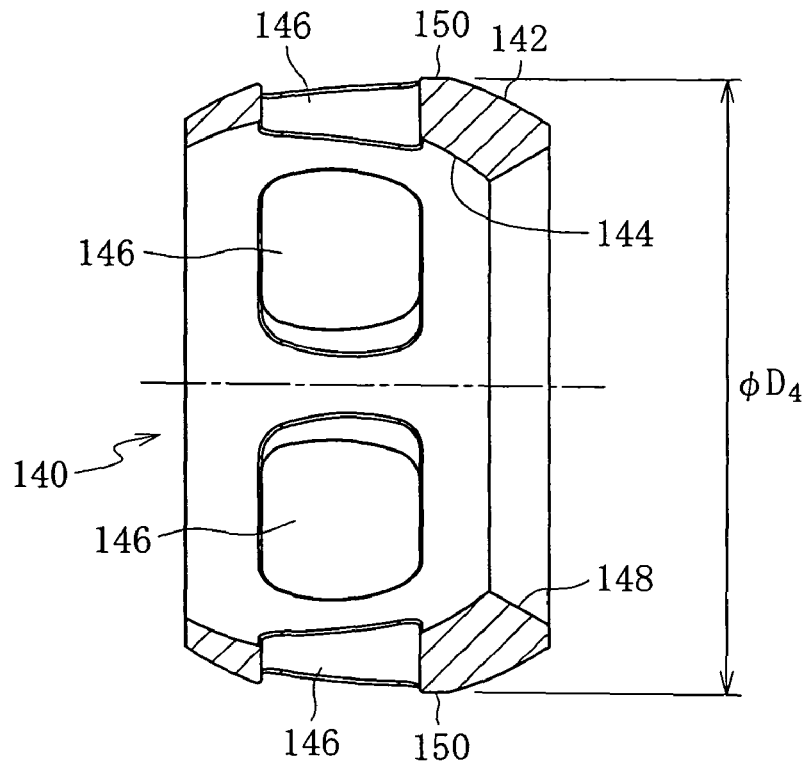
FIG. 16a is a longitudinal sectional view showing the cage used in the joint of FIG. 5.
Figure 16B:
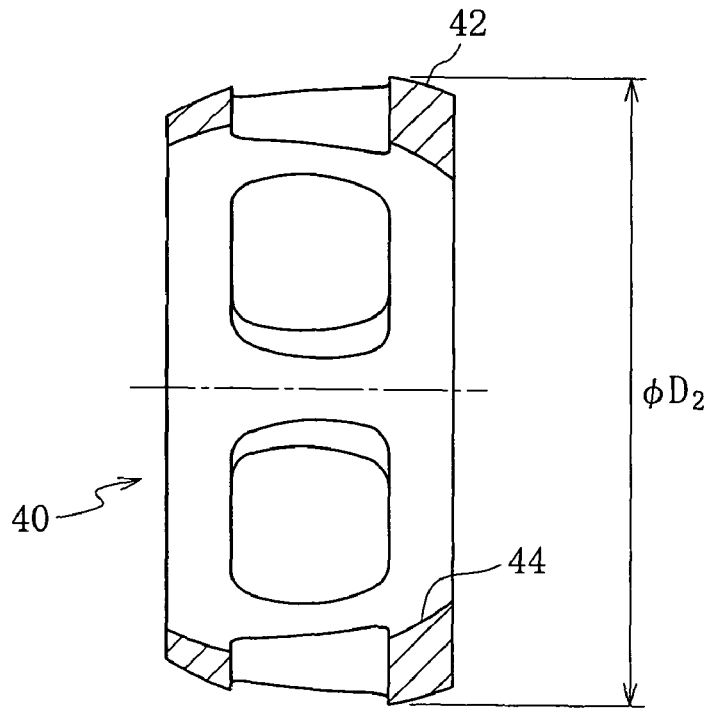
FIG. 16b is a longitudinal sectional view showing the cage used in the joint of FIG. 1.

In this embodiment, part of the spherical outer surface 142 of the cage 140 on the open end side of the pockets 146 is cut to form a planar cut face 150, and the outer diameter $\phi D_4$ of the cage 140 across the two planar cut faces 150 is smaller than the spigot diameter $\phi D_3$ of the outer ring 10. This construction makes it possible to ensure the strength of the cage 140 and at the same time construct the cage 140 with a decreased diameter $\phi D_4$ [which is smaller than the outermost diameter $\phi D_2$ of the cage 40 of the joint shown in FIG. 1 (FIG. 16b)], as shown in FIG. 16a, and thus, construct the outer ring 10 with a decreased spigot diameter $\phi D_3$ of the outer ring 10 (which is smaller than the spigot diameter $\phi D_1$ of the outer ring 10 of the joint shown in FIG. 1). Accordingly, the embrace angle (spherical angle) γ of the outer ring 10 (see FIG. 6) is not decreased, so that the assembly of the cage 140 with the outer ring 10 can be facilitated without decreasing the strength or durability of the joint or losing torque transmission.

While in this embodiment, the construction in which part of the spherical outer surface 142 is cut on the open end side of the pockets 146 and the outer diameter $\phi D_4$ of the cage 140 across the two opposing planar cut faces 150 is smaller than the spigot diameter $\phi D_3$ of the outer ring 10 is applied to the cage 140 of the joint shown in FIG. 5, the same construction can also be applied to the cage 40 of the joint shown in FIG. 1.

So far, we have discussed the effect and outcome of tapering track grooves 14, 24 of the outer ring 10 and the inner ring 20 in the joints shown in FIGS. 1 and 5 in relation to the internal force comprising the above-described track load, pocket load and spherical force, and have conducted analysis using finite element method (FEM) to determine the optimum range of the taper angle α. It has turned out that increasing the taper angle α affects the internal force in the manner shown in Table 1.

Table 1 shows the results of the analysis to determine the phase in which the ball 30 is most likely to come out of the cage pocket (Phase angle φ=0°) as well as the phase in which the internal force is at its maximum. With respect to the spherical force, the term "variation" indicates the difference between the maximum and the minimum of the spherical force.

TABLE 1

| Track load | Phase angle φ = 0° | Decrease |
|---|---|---|
| | Maximum value | Decrease |
| Pocket load | Phase angle φ = 0° | Decrease |
| | Maximum value | Increase |
| Spherical force | Maximum value | Decrease |
| | Variation | Decrease |

As can be seen from Table 1, increasing the taper angle α causes the maximum of the pocket load to increase. However, this will not pose a problem since the outer ring 10 and the cage 40 are formed thick where the ball 30 moves as far inside the outer ring 10 as possible (Phase angle φ=180°), so that the strength of the outer ring 10 and the cage 40 can be ensured. The cage 40 can be made thick in that area by increasing the cage offset f.

The analysis using finite element method (FEM) was then conducted to determine the upper limit of the taper angle α. As the taper angle α is increased, the internal force (track load and pocket load) exerted by the ball 30 in the phase where it is most likely to come out of the cage pocket (Phase angle φ=0°) is decreased. Although this seems to be advantageous in terms of joint strength, the outer ring 10 must be made relatively thin at the open end 18. To examine this in depth, the stress exerted upon the track grooves 14 was converted to the joint strength.

Figure 17:
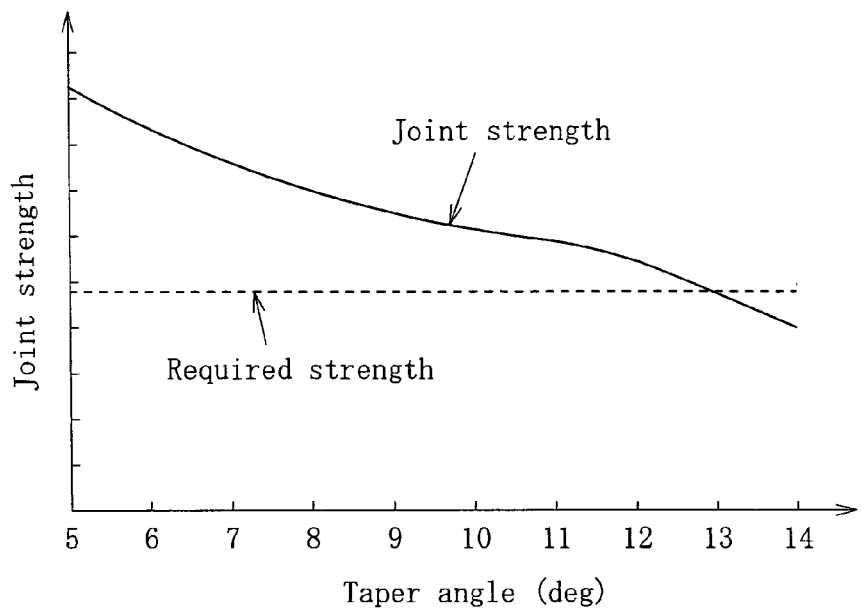
FIG. 17 is a graph showing the relationship between the joint strength and the taper angle of the track grooves.

The results are as shown in FIG. 17, which shows the relationship between the taper angle α (deg) and the joint strength. The results indicate that the joint strength decreases below the required strength at the taper angle α=12.9°. Thus, the upper limit of the optimum taper angle α is determined to be 12°.

While the above-described embodiment incorporates track offset, it may be eliminated since the provision of track offset requires the arc portion 14a of the track groove 14 of the outer ring 10, arranged farther inside the mouth portion 16, to be formed so that its depth increases inward. This gives rise to the risk that the ball 30 in its innermost position of the track groove 14 may run off the groove.

By eliminating track offset (track offset amount=0), the arc portion 14a of the track groove 14 of the outer ring 10 arranged farther inside the mouth portion 16 can be formed with a uniform depth. Accordingly, the ball 30 in its innermost position in the track groove 14 of the outer ring 10 is kept from running off the groove when the joint is operated at larger operating angles.

We now describe the results of internal force analysis in which track offset amount F, cage offset amount f, and taper angle α are varied. In the analysis, the track offset amount was fixed to zero (no track offset) in view of the performance of the ultrahigh operating angle fixed-type constant velocity universal joints by which permissive load torque does not decrease when the joint is operated at high operating angles. While the cage offset is preferably kept as small as possible in terms of internal force, minimal cage offset is still required in order to ensure proper functioning of the joint. Thus, the cage offset was varied within the following range: $0 \leq f/PCR \leq 0.150$. The taper angle α was varied between 0 deg and 12 deg.

With f=0 (f/PCR=0), the track load and the pocket load in the 0 deg phase both become zero when the taper angle α is 1.1 deg or larger.

In comparison, with the taper angle α=12 deg, the track load and the pocket load in the 0 deg phase both become zero when f is 3.94 (f/PCR=0.114) or less.

Figure 18:
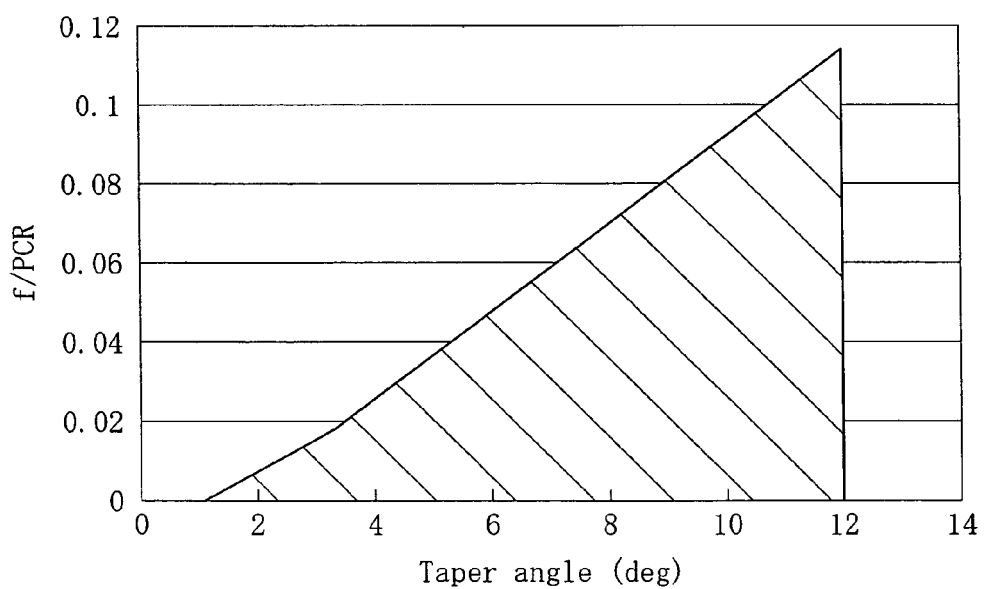
FIG. 18 is a graph showing the relationship between the taper angle of the track grooves and f/PCR.

Thus, if the relationship between the cage offset amount f and the taper angle α falls in the area indicated by oblique lines in FIG. 18, then the track load and the pocket load in the 0 deg phase are both zero. FIG. 18 is constructed based on the data obtained in the internal force analysis with the horizontal axis representing the taper angle α (deg) and vertical axis representing f/PCR.

According to these analyses, the internal specifications of the joint that can minimize the load exerted in the 0 deg phase and are advantageous during operation at larger operating angles can be determined as follows:

Track offset: zero;
Cage offset amount f: $0 < f/PCR \leq 0.15$; and
Taper angle α: $1 \text{ deg} \leq \alpha \leq 12 \text{ deg}$.

In this embodiment, the cage 40 is preferably placed in the outer ring 10 with its thick portion facing the open end 18. Such an arrangement of the cage can ensure joint strength since the load applied in the 0 deg phase is decreased whereas the peak load is increased as compared to conventional constant velocity universal joints.

Figure 19:
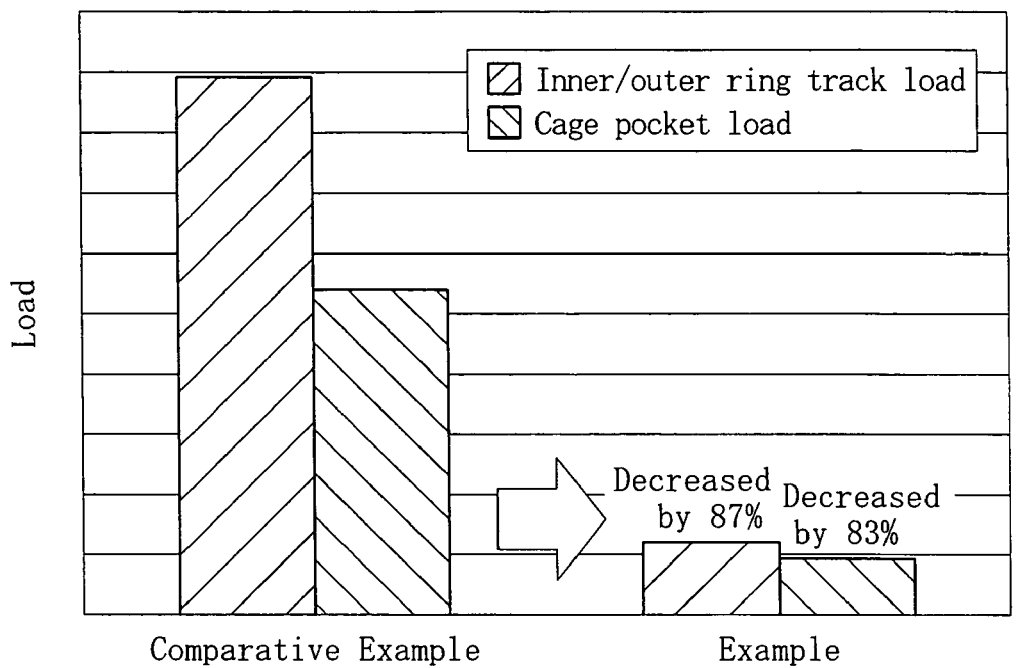
FIG. 19 is a graph showing the load in the 0 degree phase when a base torque is applied.

Using a joint of the present invention (Example) having dimensions determined based on the above-described specifications and a conventional joint (Comparative Example), an experiment was conducted to determine the track load and the pocket load applied in the 0 deg phase. The results are as shown in FIG. 19. As shown, the track load and the pocket load observed in Example were each lower than those in Comparative Example by more than 80%. The calculated EWS internal forces were shown in Table 2 (T=T100 (462.6 Nm), θ=46.5 deg).

TABLE 2

| Parameters | Example | Comparative Example |
|---|---|---|
| θ max | 52 | 50 |
| Taper angle: α (deg) | 5.233 | 0 |
| Number of balls | 6 | 6 |
| Diameter of ball (mm) | 19.844 | 20.638 |
| PCD (mm) | 69.32 | 68.02 |
| % contact of inner ring | 1.04 | 1.04 |
| % contact of outer ring | 1.08 | 1.08 |
| Track offset: F (mm) | 0 | 4.53 |
| Cage offset: f (mm) | 3.11 | 0.57 |
| Contact angle (deg) | 35 | 40 |
| Spherical radial gap between inner ring and cage (mm) | 0.0288 | 0.0263 |
| Spherical radial gap between outer ring and cage (mm) | 0.0288 | 0.0288 |

TABLE 2-continued

| Parameters | | Example | Comparative Example |
|---|---|---|---|
| PCD gap (mm) | | 0.04 | 0.0175 |
| Pocket gap adjacent to open end (mm) | | −0.01025 | −0.00825 |
| Cage pocket gap inside the joint (mm) | | −0.01025 | −0.00825 |
| Track load* | Phase angle = 0 deg | 582 | 4458 |
| | Maximum value | 15156 | 13747 |
| Pocket load* | Phase angle = 0 deg | 455 | 2696 |
| | Maximum value | 5091 | 4466 |

*Load is measured under load torque of 462.6 Nm(T100)/θ max.

Figure 20:
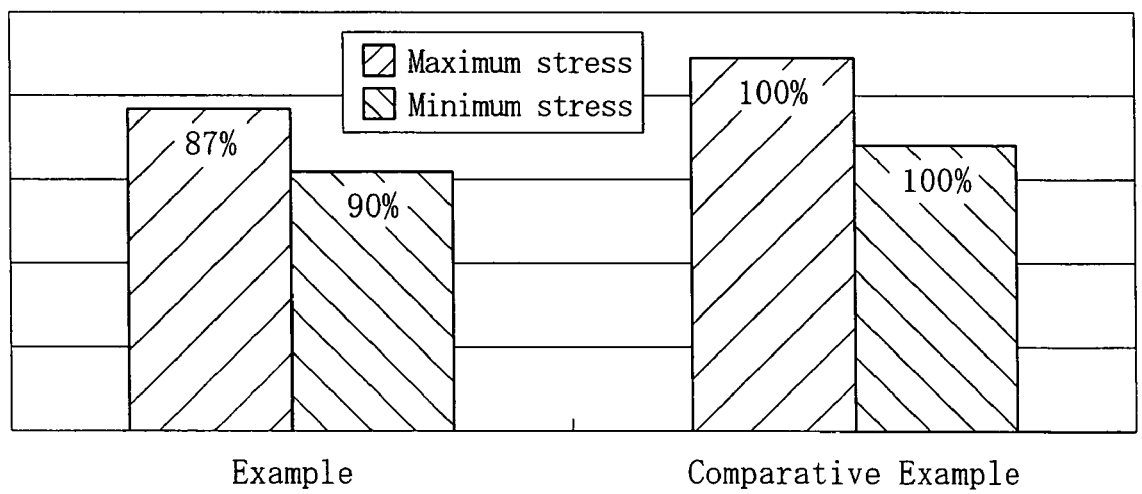
FIG. 20 is a graph showing a comparison between Comparative Example and Example of the stress applied to the pocket wall under maximum pocket load.

Using a joint of the present invention (Example) having dimensions determined based on the above-described specifications and a conventional universal joint (Comparative Example), another experiment was conducted to determine the stress exerted upon the side wall of the cage when the maximum pocket load in the 0 deg phase was applied. The results are as shown in FIG. 20.

The joint of Example was operated at a larger operating angle (56°) than the joint of Comparative Example (50°). The percentages were relative to the stress observed in Comparative Example (=100). As shown by the results, the exerted stress was lower in the joint of Example than in the joint of Comparative Example, indicating that the cage of the present invention having the above specifications has comparable or higher strength than the cage of Comparative Example when the joint is operated at larger operating angles than the joint of Comparative Example.

Next, the joint of Example was compared with the joint of Comparative Example for the effect and outcome of tapering track grooves in relation to the internal force (in particular, pocket load). It was demonstrated that the pocket load exerted during operation at the maximum operating angle by the ball in the phase where it was most likely to come out of the cage pocket (Phase angle=0 deg) was significantly decreased in Example. However, analysis of the pocket load exerted by the ball in other phases indicated that the pocket load observed in Comparative Example was 4671 N (maximum value) as compared to 5939 N (maximum value) in Example.

Figure 21:
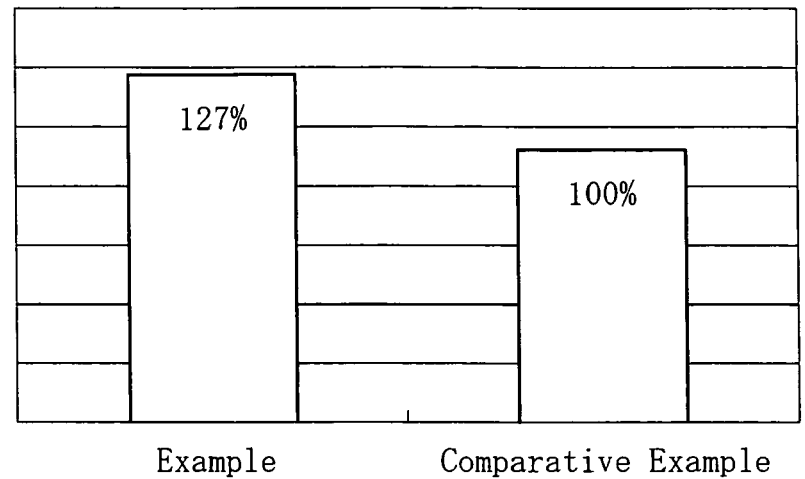
FIG. 21 is a graph showing a comparison of pocket load (maximum) between Comparative Example and Example.
Figure 22:
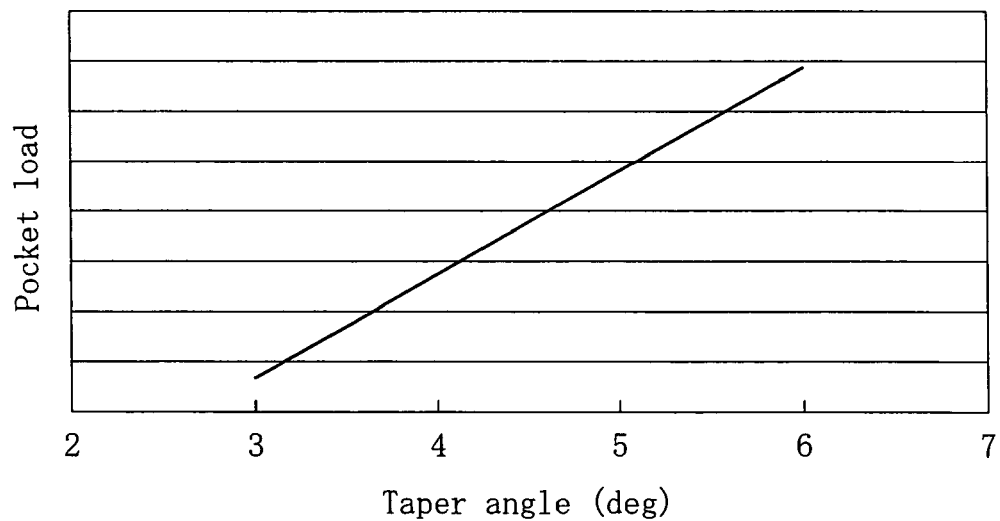
FIG. 22 is a graph showing the relationship between the taper angle and the pocket load.

Thus, the maximum pocket load was approximately 30% higher in Example then in Comparative Example (FIG. 21). In this experiment, the same load torque was applied but the joints were operated at different operating angles: The joint of Example was operated at a higher operating angle (56°) than the joint of Comparative Example (50°). The specifications for the joints of Comparative Example and Example are shown in Table 3.

TABLE 3

| Parameters | Comparative Example | Example |
|---|---|---|
| Do/d | 3.7 | 4.1 |
| t/d | 0.26 | 0.32 |
| w/d | 1.8 | 1.9 |
| α | 0 | 5.15° |
| f/PCR | 0.017 | 0.09 |

The increase in the maximum pocket load in Example was considered to be caused by tapering of the track grooves and increased operating angle. Thus, the following cage specifications are employed so that the joint can withstand the increased pocket load and premature breakage of the joint can be avoided. The figures in the brackets are specifications for conventional fixed-type constant velocity universal joints (BJ) or fixed-type constant velocity universal joints (UJ). The outer diameter Do, inner diameter Di, and width w are as shown in FIG. 2. The cage thickness t is the thickness measured at the center of the cage along the central axis.

The ratio (Do/d) of the cage outer diameter (Do) to the ball diameter (d): $3.9 \leq Do/d \leq 4.1$ ($3.7 \leq Do/d \leq 3.8$)

The ratio (t/d) of the cage thickness (t) to the ball diameter (d): $0.31 \leq t/d \leq 0.34$ ($0.24 \leq t/d \leq 0.27$)

The ratio (w/d) of the cage width (w) to the ball diameter (d): $1.8 \leq w/d \leq 2.0$ ($1.8 \leq w/d \leq 1.9$)

The ratio (Di/d) of the cage inner diameter (Di) to the ball diameter (d) is determined from the cage outer diameter and the cage thickness. For reference, the ratio is as follows:

$$3.25 \leq Di/d \leq 3.45 (3.10 \leq Di/d \leq 3.25).$$

Since the pocket load acts in the direction that goes from the inside of the mouth portion of the outer ring to the open end of the outer ring, the cage is placed in the outer ring so that the thick end of the cage is adjacent to the open end and the thin end of the cage is inside the mouth portion of the outer ring. This is because of the need to form an appropriate spigot diameter for the assembly of inner ring. The pocket load that acts in the direction that goes from the open end of the outer ring to the inside of the mouth portion of the outer ring is relatively minor and causes no particular problems.

What is claimed is:

1. A fixed constant velocity universal joint comprising:

an outer joint member having a spherical inner surface with an open end and a plurality of track grooves formed on the spherical inner surface, the track grooves each extending along an axis direction toward the open end and being equally spaced apart along a circumference of the spherical inner surface;

an inner joint member having a spherical outer surface and a plurality of track grooves corresponding to the track grooves of the outer joint member formed on the spherical outer surface, the track grooves each extending along the axis direction and being equally spaced apart along a circumference of the spherical outer surface;

a plurality of balls received in the respective track grooves of the outer and inner joint members so as to transmit torque; and a cage for holding the plurality of balls, the cage being arranged between the spherical inner surface of the outer joint member and the spherical outer surface of the inner joint member, the cage having a spherical outer surface and a spherical inner surface, wherein:

a center of the spherical outer surface of the cage and a center of the spherical inner surface of the cage are oppositely offset from a center of the joint by an equal distance along the axis direction;

a wall of the cage, as viewed in longitudinal section, is thicker in an area adjacent to the open end of the outer joint member than the wall of the cage in an area away from the open end;

the track grooves of the outer joint member each have a bottom linearly tapered in an area adjacent to the open end so that a depth of the grooves increases toward the open end;

the track grooves of the inner joint member each have a bottom linearly tapered in an area away from the open end so that a depth of the grooves decreases toward the end of the inner joint member opposite to the open end; and in a position in which an operating angle between a rotation axis of the outer joint member and a rotation axis of the inner joint member is 0°, an end of the spherical outer surface of the cage adjacent to the open end of the outer joint member is axially extended from the open end of the outer joint member, wherein a tapered surface extends from an end of the spherical inner surface of the cage adjacent to the open end of the joint toward the end of the spherical outer surface of the cage adjacent to the open end of the joint such that the tapered surface has an increasing diameter toward the end of the spherical outer surface of the cage, and wherein the tapered surface tapers at an angle which is greater than or equal to half of a maximum operating angle between the rotation axis of the outer joint member and the rotation axis of the inner joint member.

2. The fixed constant velocity universal joint of claim 1, wherein a ratio f/PCR has a value greater than zero and smaller than or equal to 0.12, given that the cage offset amount between the center of the spherical outer surface and the center of the spherical inner surface of the cage is f, and a length of a line segment connecting the center of curvature of the track grooves of the outer joint member or the center of curvature of the track grooves of the inner joint member with a ball center is PCR.

3. The fixed constant velocity universal joint of claim 2, wherein the track grooves of the outer and inner joint members are finished by cold forging.

4. The fixed constant velocity universal of claim 1, wherein the track grooves of the outer and inner joint members are finished by cold forging.

5. The fixed constant velocity universal joint of claim 1, wherein a taper angle of the track grooves of the outer and inner joint members is set to 12° or smaller.

6. The fixed constant velocity universal joint of claim 5, wherein a ratio f/PCR has a value greater than zero and smaller than or equal to 0.12, given that the cage offset amount between the center of the spherical outer surface and the center of the spherical inner surface of the cage is f, and a length of a line segment connecting the center of curvature of the track grooves of the outer joint member or the center of curvature of the track grooves of the inner joint member with a ball center is PCR.

7. The fixed constant velocity universal joint of claim 6, wherein the track grooves of the outer and inner joint members are finished by cold forging.

8. The fixed constant velocity universal joint of claim 5, wherein the track grooves of the outer and inner joint members are finished by cold forging.

9. The fixed constant velocity universal joint of claim 1, wherein:

part of the spherical outer surface of the cage is cut on an open end side of at least two opposing pockets, and an outer diameter of the cage across the open end side of two opposing pockets is smaller than a spigot diameter of the outer joint member.

10. The fixed constant velocity universal joint of claim 9, wherein a ratio f/PCR has a value greater than zero and smaller than or equal to 0.12, given that the cage offset amount between the center of the spherical outer surface and the center of the spherical inner surface of the cage is f, and a length of a line segment connecting the center of curvature of the track grooves of the outer joint member or the center of curvature of the track grooves of the inner joint member with a ball center is PCR.

11. The fixed constant velocity universal joint of claim 10, wherein the track grooves of the outer and inner joint members are finished by cold forging.

12. The fixed constant velocity universal joint of claim 9, wherein the track grooves of the outer and inner joint members are finished by cold forging.

* * * * *